US012682406B2

(12) United States Patent
Vandike et al.

(10) Patent No.: US 12,682,406 B2
(45) Date of Patent: Jul. 14, 2026

(54) AGRICULTURAL SYSTEM CONTROL BASED ON PROGRESSIVE TIME HORIZON MODEL OUTPUT

(71) Applicant: Deere & Company, Moline, IL (US)

(72) Inventors: Nathan R. Vandike, Geneseo, IL (US); Bhanu Kiran Reddy Palla, Bettendorf, IA (US)

(73) Assignee: Deere & Company, Moline, IL (US)

( * ) Notice: Subject to any disclaimer, the term of this patent is extended or adjusted under 35 U.S.C. 154(b) by 429 days.

(21) Appl. No.: 17/860,413

(22) Filed: Jul. 8, 2022

(65) Prior Publication Data

US 2024/0013124 A1     Jan. 11, 2024

(51) Int. Cl.
| | |
|---|---|
| *G06Q 50/02* | (2024.01) |
| *A01B 79/00* | (2006.01) |
| *G06Q 10/04* | (2023.01) |
| *G06Q 10/0637* | (2023.01) |
| *G06Q 10/0639* | (2023.01) |
| *G06Q 10/067* | (2023.01) |

(52) U.S. Cl.
CPC ........... *G06Q 50/02* (2013.01); *A01B 79/005* (2013.01); *G06Q 10/04* (2013.01); *G06Q 10/06375* (2013.01); *G06Q 10/0639* (2013.01); *G06Q 10/067* (2013.01)

(58) Field of Classification Search
CPC ............. G06Q 10/06375; G06Q 10/04; G06Q 10/0639; G06Q 10/067; G06Q 50/02; A01B 69/00; A01B 79/005
See application file for complete search history.

(56) References Cited

U.S. PATENT DOCUMENTS

| | | | |
|---|---|---|---|
| 3,819,837 | A | 6/1974 | Keith et al. |
| 6,037,901 | A | 3/2000 | Devier et al. |
| 6,128,574 | A | 10/2000 | Diekhans |
| 6,216,071 | B1 | 4/2001 | Motz |
| 6,327,569 | B1 | 12/2001 | Reep |
| 6,360,179 | B1 | 3/2002 | Reep |

(Continued)

FOREIGN PATENT DOCUMENTS

| | | |
|---|---|---|
| CA | 3081383 A1 | 5/2019 |
| CN | 103181263 A | 7/2013 |

(Continued)

OTHER PUBLICATIONS

Mitsuhashi, et al., Autonomous Travel of Lettuce Harvester Using Model Predictive Control, 52 IFAC Papers OnLine 155 (2019) (Year: 2019).*

*Primary Examiner* — Charles Guiliano
(74) *Attorney, Agent, or Firm* — Christopher J. Volkmann; KELLY, HOLT & CHRISTENSON PLLC

(57) ABSTRACT

A predictive engine obtains as inputs a set of optimization criteria and a time horizon selection input and applies those inputs to a time horizon model in a variable time horizon prediction engine. A user interface is generated that provides actuatable elements that can be actuated in order to access different time horizon models in the variable time horizon prediction engine. Operational parameters can be adjusted so that the variable time horizon prediction engine provides an output indicative of a control signal that can be used to improve operation of the agricultural system over the selected time horizon.

18 Claims, 10 Drawing Sheets

(56) References Cited

U.S. PATENT DOCUMENTS

| | | |
|---|---|---|
| 6,587,772 B2 | 7/2003 | Behnke |
| 6,687,616 B1 | 2/2004 | Peterson et al. |
| 6,990,459 B2 | 1/2006 | Schneider |
| 7,155,888 B2 | 1/2007 | Diekhans |
| 7,261,632 B2 | 8/2007 | Pirro et al. |
| 7,555,283 B2 | 6/2009 | Fitzner et al. |
| 7,562,167 B2 | 7/2009 | Anderson |
| 7,725,233 B2 | 5/2010 | Hendrickson et al. |
| 7,756,624 B2 | 7/2010 | Diekhans et al. |
| 8,060,283 B2 | 11/2011 | Mott et al. |
| 8,145,393 B2 | 3/2012 | Foster et al. |
| 8,254,351 B2 | 8/2012 | Fitzner et al. |
| 8,280,595 B2 | 10/2012 | Foster et al. |
| 8,437,901 B2 | 5/2013 | Anderson |
| 8,606,454 B2 | 12/2013 | Wang et al. |
| 8,626,408 B1 | 1/2014 | Schleicher et al. |
| 8,639,408 B2 | 1/2014 | Anderson |
| 8,738,238 B2 | 5/2014 | Rekow |
| 8,781,692 B2 | 7/2014 | Kormann |
| 8,868,304 B2 | 10/2014 | Banefas |
| 8,942,860 B2 | 1/2015 | Morselli |
| 9,014,901 B2 | 4/2015 | Wang et al. |
| 9,188,986 B2 | 11/2015 | Baumann |
| 9,326,444 B2 | 5/2016 | Bonefas |
| 9,392,746 B2 | 7/2016 | Darr et al. |
| 9,523,180 B2 | 12/2016 | Deines |
| 9,529,364 B2 | 12/2016 | Foster et al. |
| 9,605,583 B2 | 3/2017 | Goering et al. |
| 9,642,305 B2 | 5/2017 | Nykamp et al. |
| 9,675,008 B1 | 6/2017 | Rusciolelli et al. |
| 9,772,625 B2 | 9/2017 | Gilmore et al. |
| 9,992,931 B2 | 6/2018 | Bonefas et al. |
| 9,992,932 B2 | 6/2018 | Bonefas et al. |
| 10,015,928 B2 | 7/2018 | Nykamp et al. |
| 10,064,335 B2 | 9/2018 | Byttebier et al. |
| 10,126,282 B2 | 11/2018 | Anderson et al. |
| 10,129,528 B2 | 11/2018 | Bonefas et al. |
| 10,317,272 B2 | 6/2019 | Bhavsar et al. |
| 10,398,084 B2 | 9/2019 | Ray et al. |
| 10,537,061 B2 | 1/2020 | Farley et al. |
| 10,677,637 B1 | 6/2020 | Von Muenster |
| 10,760,946 B2 | 9/2020 | Meier et al. |
| 10,809,118 B1 | 10/2020 | Von Muenster |
| 10,830,634 B2 | 11/2020 | Blank et al. |
| 10,890,922 B2 | 1/2021 | Ramm et al. |
| 10,966,071 B2 | 3/2021 | Suleman et al. |
| 11,008,177 B2 | 5/2021 | Banthia et al. |
| 11,112,262 B2 | 9/2021 | Anderson |
| 2002/0083695 A1 | 7/2002 | Behnke et al. |
| 2004/0116169 A1 | 6/2004 | Isfort et al. |
| 2005/0279070 A1 | 12/2005 | Pirro et al. |
| 2005/0284119 A1 | 12/2005 | Brunnert |
| 2006/0047418 A1 | 3/2006 | Metzler et al. |
| 2006/0094487 A1 | 5/2006 | Huster et al. |
| 2007/0037621 A1 | 2/2007 | Isfort |
| 2007/0089390 A1 | 4/2007 | Hendrickson et al. |
| 2008/0245042 A1 | 10/2008 | Brunnert et al. |
| 2009/0044505 A1 | 2/2009 | Huster et al. |
| 2009/0306835 A1 | 12/2009 | Ellermann et al. |
| 2010/0070145 A1 | 3/2010 | Foster et al. |
| 2010/0332051 A1 | 12/2010 | Kormann |
| 2011/0022273 A1 | 1/2011 | Peters et al. |
| 2011/0061762 A1 | 3/2011 | Madsen et al. |
| 2011/0066337 A1 | 3/2011 | Kormann |
| 2011/0160961 A1 | 6/2011 | Wollenhaupt et al. |
| 2011/0205084 A1 | 8/2011 | Morselli et al. |
| 2011/0224873 A1 | 9/2011 | Reeve et al. |
| 2012/0029732 A1 | 2/2012 | Meyer |
| 2012/0085458 A1 | 4/2012 | Wenzel |
| 2012/0087771 A1 | 4/2012 | Wenzel |
| 2012/0166243 A1 | 6/2012 | Belmont et al. |
| 2012/0215394 A1 | 8/2012 | Wang et al. |
| 2012/0215409 A1 | 8/2012 | Wang et al. |
| 2012/0263560 A1 | 10/2012 | Diekhans et al. |
| 2012/0265412 A1 | 10/2012 | Diekhans et al. |
| 2012/0302299 A1 | 11/2012 | Behnke et al. |
| 2013/0019580 A1 | 1/2013 | Anderson et al. |
| 2013/0022430 A1 | 1/2013 | Anderson et al. |
| 2013/0211675 A1 | 8/2013 | Bonefas |
| 2013/0213518 A1 | 8/2013 | Bonefas |
| 2013/0227922 A1 | 9/2013 | Zametzer et al. |
| 2014/0121882 A1 | 5/2014 | Gilmore et al. |
| 2014/0224377 A1 | 8/2014 | Bonefas |
| 2014/0311113 A1 | 10/2014 | Bonefas |
| 2014/0324272 A1 | 10/2014 | Madsen et al. |
| 2015/0094944 A1 | 4/2015 | Baumann |
| 2015/0189832 A1 | 7/2015 | Krause et al. |
| 2015/0327425 A1 | 11/2015 | Dillon |
| 2016/0061643 A1 | 3/2016 | Wilson et al. |
| 2016/0183463 A1 | 6/2016 | Herman et al. |
| 2016/0252384 A1 | 9/2016 | Wilson et al. |
| 2016/0270294 A1 | 9/2016 | Viaene et al. |
| 2017/0042088 A1 | 2/2017 | Nykamp et al. |
| 2017/0049053 A1 | 2/2017 | Bonefas et al. |
| 2017/0055446 A1 | 3/2017 | Nykamp et al. |
| 2017/0086378 A1 | 3/2017 | Lisouski et al. |
| 2017/0206645 A1 | 7/2017 | Bonefas et al. |
| 2017/0245435 A1 | 8/2017 | Rusciolelli et al. |
| 2017/0276534 A1 | 9/2017 | Vermue et al. |
| 2017/0284072 A1 | 10/2017 | Jensen |
| 2018/0022559 A1 | 1/2018 | Knutson |
| 2018/0037424 A1 | 2/2018 | Green et al. |
| 2019/0050948 A1* | 2/2019 | Perry ..................... G06Q 30/02 |
| 2019/0254242 A1* | 8/2019 | Allen ..................... G06Q 10/04 |
| 2019/0261560 A1 | 8/2019 | Jelenkovic |
| 2019/0351765 A1 | 11/2019 | Rabusic |
| 2019/0364734 A1 | 12/2019 | Kriebel et al. |
| 2020/0064144 A1 | 2/2020 | Tomita et al. |
| 2020/0064863 A1 | 2/2020 | Tomita et al. |
| 2020/0090094 A1 | 3/2020 | Blank |
| 2020/0128734 A1 | 4/2020 | Brammeier et al. |
| 2020/0128737 A1 | 4/2020 | Anderson et al. |
| 2020/0128738 A1 | 4/2020 | Suleman et al. |
| 2020/0128740 A1 | 4/2020 | Suleman |
| 2020/0133262 A1 | 4/2020 | Suleman et al. |
| 2020/0137957 A1 | 5/2020 | Friesen |
| 2020/0187409 A1 | 6/2020 | Meyer zu Helligen |
| 2020/0196526 A1 | 6/2020 | Koch et al. |
| 2020/0226519 A1 | 7/2020 | Karthik et al. |
| 2020/0317114 A1 | 10/2020 | Hoff |
| 2020/0319632 A1 | 10/2020 | Desai et al. |
| 2020/0319655 A1 | 10/2020 | Desai et al. |
| 2020/0352099 A1 | 11/2020 | Meier et al. |
| 2020/0359547 A1 | 11/2020 | Sakaguchi et al. |
| 2020/0359549 A1 | 11/2020 | Sakaguchi et al. |
| 2020/0375083 A1 | 12/2020 | Anderson et al. |
| 2020/0375084 A1 | 12/2020 | Sakaguchi et al. |
| 2020/0378088 A1 | 12/2020 | Anderson |
| 2020/0402184 A1* | 12/2020 | Dasgupta ......... G06Q 10/06314 |
| 2020/0404842 A1 | 12/2020 | Dugas et al. |
| 2021/0015041 A1 | 1/2021 | Bormann et al. |
| 2021/0026362 A1 | 1/2021 | Wilson et al. |
| 2021/0029877 A1 | 2/2021 | Vandike et al. |
| 2021/0099522 A1 | 4/2021 | Chiocco et al. |
| 2021/0129853 A1* | 5/2021 | Appleton ............ G06Q 10/047 |
| 2021/0294337 A1 | 9/2021 | Van Mill et al. |
| 2021/0333802 A1 | 10/2021 | Singh et al. |
| 2021/0337729 A1 | 11/2021 | O'Connor et al. |
| 2021/0339729 A1 | 11/2021 | O'Connor et al. |
| 2021/0398190 A1* | 12/2021 | Stenzel .................. G06Q 10/04 |
| 2022/0015288 A1 | 1/2022 | Christiansen et al. |
| 2022/0019238 A1 | 1/2022 | Christiansen et al. |
| 2022/0019239 A1 | 1/2022 | Christiansen et al. |
| 2022/0019240 A1 | 1/2022 | Christiansen et al. |
| 2022/0019241 A1 | 1/2022 | Christiansen et al. |
| 2022/0039318 A1 | 2/2022 | Rasie et al. |
| 2022/0095539 A1 | 3/2022 | Faust et al. |
| 2022/0110238 A1 | 4/2022 | Vandike et al. |
| 2022/0110246 A1 | 4/2022 | Vandike et al. |
| 2022/0110253 A1 | 4/2022 | Anderson et al. |
| 2022/0110262 A1 | 4/2022 | Vandike et al. |
| 2022/0113727 A1 | 4/2022 | Vandike et al. |
| 2022/0117143 A1 | 4/2022 | Kraus et al. |
| 2022/0122197 A1 | 4/2022 | Hanrieder |

(56) References Cited

U.S. PATENT DOCUMENTS

| | | |
|---|---|---|
| 2022/0132736 A1 | 5/2022 | Meyers et al. |
| 2022/0132737 A1 | 5/2022 | Anderson et al. |
| 2022/0176818 A1 | 6/2022 | Piscopo et al. |
| 2022/0197302 A1 | 6/2022 | McClelland et al. |
| 2022/0204051 A1 | 6/2022 | Rands et al. |
| 2022/0204052 A1 | 6/2022 | Creaby et al. |
| 2022/0206512 A1 | 6/2022 | Rands et al. |
| 2022/0207852 A1 | 6/2022 | Sharma et al. |
| 2022/0225568 A1 | 7/2022 | Töniges et al. |
| 2022/0232763 A1 | 7/2022 | Reddy Palla et al. |
| 2022/0232770 A1 | 7/2022 | Yanke et al. |
| 2022/0256770 A1 | 8/2022 | Faust et al. |
| 2022/0304227 A1 | 9/2022 | Hill et al. |
| 2022/0304231 A1 | 9/2022 | Faust et al. |
| 2022/0374026 A1 | 11/2022 | Vougioukas et al. |
| 2022/0382277 A1 | 12/2022 | Nishii et al. |
| 2022/0408645 A1 | 12/2022 | O'Connor et al. |
| 2022/0410704 A1 | 12/2022 | O'Connor et al. |
| 2023/0027697 A1 | 1/2023 | Rush |
| 2023/0031013 A1 | 2/2023 | Faust et al. |
| 2023/0035890 A1 | 2/2023 | McKinney et al. |
| 2023/0041687 A1 | 2/2023 | Kormann |

FOREIGN PATENT DOCUMENTS

| | | |
|---|---|---|
| CN | 107330615 A | 11/2017 |
| CN | 111201879 A | 5/2020 |
| CN | 111406505 A | 7/2020 |
| CN | 114846991 A | 8/2022 |
| CN | 114915637 A | 8/2022 |
| CN | 115067061 A | 9/2022 |
| CN | 115280960 A | 11/2022 |
| CN | 115643895 A | 1/2023 |
| DE | 102009041646 A1 | 3/2011 |
| DE | 102010004648 A1 | 7/2011 |
| DE | 202012103730 U1 | 10/2012 |
| DE | 102012211001 A1 | 1/2014 |
| DE | 102013012027 A1 | 1/2015 |
| DE | 102011005400 B4 | 5/2015 |
| DE | 102015109799 A1 | 12/2016 |
| DE | 102017204511 A1 | 9/2018 |
| DE | 102011052688 | 2/2021 |
| DE | 102020124508 A1 | 3/2022 |
| EP | 1219153 A2 | 7/2002 |
| EP | 1219159 A1 | 7/2002 |
| EP | 1674324 A1 | 6/2006 |
| EP | 1609349 B1 | 6/2008 |
| EP | 2057884 A1 | 5/2009 |
| EP | 1731983 81 | 9/2009 |
| EP | 2174537 A1 | 4/2010 |
| EP | 2186389 A1 | 5/2010 |
| EP | 2301318 B1 | 11/2011 |
| EP | 2146307 B1 | 5/2012 |
| EP | 2508057 A1 | 10/2012 |
| EP | 2621258 A1 | 8/2013 |
| EP | 2786325 A1 | 10/2014 |
| EP | 2829171 A2 | 1/2015 |
| EP | 2452551 81 | 5/2017 |
| EP | 2995191 B1 | 10/2017 |
| EP | 3315006 A1 | 5/2018 |
| EP | 3315007 A1 | 5/2018 |
| EP | 3316218 A1 | 5/2018 |
| EP | 3289853 81 | 3/2019 |
| EP | 3289852 B1 | 6/2019 |
| EP | 3000307 B1 | 12/2019 |
| EP | 3593620 A1 | 1/2020 |
| EP | 3243374 B1 | 3/2020 |
| EP | 2812267 B1 | 2/2021 |
| EP | 3847878 A1 | 7/2021 |
| EP | 3819837 A1 | 9/2021 |
| EP | 3706544 B1 | 12/2021 |
| EP | 3970471 A1 | 3/2022 |
| EP | 3315005 B1 | 4/2022 |
| GB | 2517049 A | 2/2015 |
| IN | 202241032643 A | 6/2022 |
| JP | 2002186348 A | 7/2002 |
| JP | 2015084667 A | 5/2015 |
| JP | 2018068284 A | 5/2018 |
| JP | 2019004796 A | 1/2019 |
| JP | 2019216744 A | 12/2019 |
| JP | 2020127405 A | 8/2020 |
| JP | 2021069341 A | 5/2021 |
| JP | 2022141070 A | 9/2022 |
| RU | 2529905 C2 | 10/2014 |
| UA | 90246 C2 | 4/2010 |
| WO | 2012110544 A1 | 8/2012 |
| WO | 2013086351 A1 | 6/2013 |
| WO | WO2013087275 A1 | 6/2013 |
| WO | 2013120079 A1 | 8/2013 |
| WO | 2013141975 A2 | 9/2013 |
| WO | 2013151619 A2 | 10/2013 |
| WO | 2013162673 A2 | 10/2013 |
| WO | 2013184177 A2 | 12/2013 |
| WO | 2013184178 A2 | 12/2013 |
| WO | 2014046685 A1 | 3/2014 |
| WO | 2014116819 A1 | 7/2014 |
| WO | WO2018043336 A1 | 3/2018 |
| WO | WO2018112615 A1 | 6/2018 |
| WO | WO2018116772 A1 | 6/2018 |
| WO | 2018142768 A1 | 8/2018 |
| WO | 2018185522 A1 | 10/2018 |
| WO | 2018226139 A1 | 12/2018 |
| WO | WO2019124174 A1 | 6/2019 |
| WO | WO2019124217 A1 | 6/2019 |
| WO | WO2019124225 A1 | 6/2019 |
| WO | WO2019124273 A1 | 6/2019 |
| WO | 2019215185 A1 | 11/2019 |
| WO | WO2020026578 A1 | 2/2020 |
| WO | WO2020026650 A1 | 2/2020 |
| WO | WO2020026651 A1 | 2/2020 |
| WO | WO2020031473 A1 | 2/2020 |
| WO | WO2020038810 A1 | 2/2020 |
| WO | WO2020039671 A1 | 2/2020 |
| WO | WO2020044726 A1 | 3/2020 |
| WO | WO202082182 A1 | 4/2020 |
| WO | WO2020100810 A1 | 5/2020 |
| WO | WO2020110920 A1 | 6/2020 |
| WO | 2020206941 A1 | 10/2020 |
| WO | WO2020206942 A1 | 10/2020 |
| WO | WO21049098 A1 | 3/2021 |
| WO | WO21246384 A1 | 12/2021 |
| WO | 2022118572 A1 | 6/2022 |
| WO | WO22130038 A1 | 6/2022 |
| WO | WO22130039 A1 | 6/2022 |
| WO | WO22268779 A2 | 12/2022 |

* cited by examiner

AGRICULTURAL SYSTEM CONTROL BASED ON PROGRESSIVE TIME HORIZON MODEL OUTPUT

FIELD OF THE DESCRIPTION

The present description relates to control of agricultural systems. More specifically, the present description relates to identifying operational inefficiencies over different selectable time horizons and using predictive models to modify control of the agricultural system.

BACKGROUND

There are currently a wide variety of different types of agricultural machines that perform a wide variety of different types of agricultural operations. Some agricultural operations use multiple pieces of agricultural equipment with multiple different operators. In performing such operations, the conditions under which the operations are performed can vary.

By way of example, some agricultural operations that use multiple different pieces of equipment with multiple different operators may include harvesting operations. In harvesting operations, there may be multiple different harvesters performing the harvesting operation. Also, even if there is only a single harvester, there might be multiple different tractor operators that are operating tractors pulling grain carts.

Another example of an agricultural operation may include an application operation in which a material is applied to a field. For instance, an application operation may be used to apply fertilizer, pesticide, herbicide, or other material. Also, an application operation may include a planting operation where seed is planted in a field. Such application operations can include multiple application machines and also tender vehicles that are tasked with providing additional material to an application machine, to refill the tanks or other material reservoirs on the application machine.

The discussion above is merely provided for general background information and is not intended to be used as an aid in determining the scope of the claimed subject matter.

SUMMARY

A predictive engine obtains as inputs a set of optimization criteria and a time horizon selection input and applies those inputs to a time horizon model in a variable time horizon prediction engine. A user interface is generated that provides actuatable elements that can be actuated in order to access different time horizon models in the variable time horizon prediction engine. Operational parameters can be adjusted so that the variable time horizon prediction engine provides an output indicative of a control signal that can be used to improve operation of the agricultural system over the selected time horizon.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
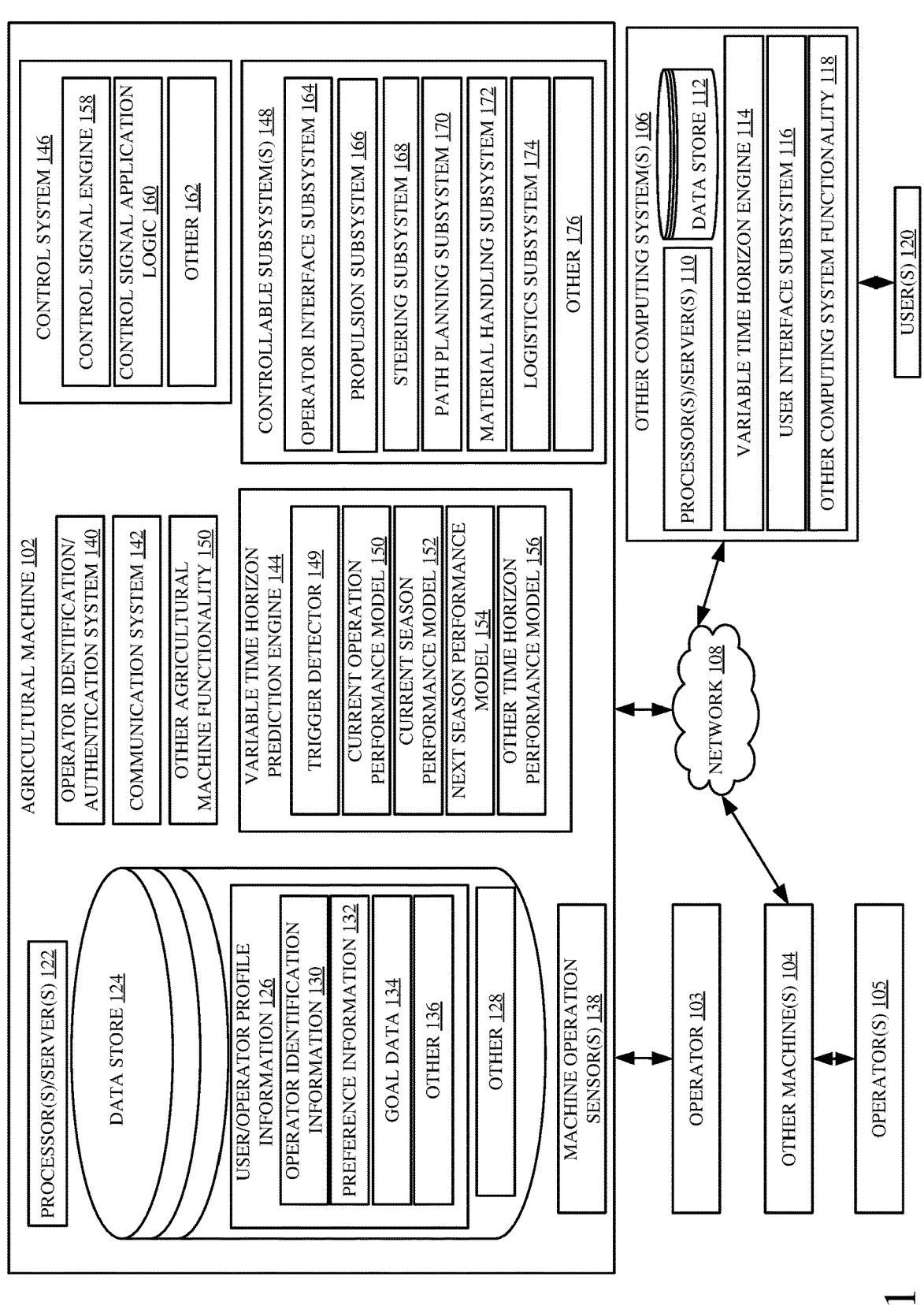
FIG. 1 is a block diagram of one example of an agricultural system.

As discussed above, operations involving multiple pieces of equipment and/or multiple operators can suffer from inefficiencies especially in environments where conditions may be variable. Such inefficiencies can be in the form of wasted energy or extra equipment and/or operators that are not being used effectively. The inefficiencies can also be in terms of lost opportunity by not having enough equipment or the right types of equipment at the proper locations and at the proper times.

Some systems have thus attempted to identify sources of inefficiency so that they can be remedied. However, these types of systems use a general model to predict such things as resource requirements which may be needed to improve efficiency. However, such systems are often limited in the time horizon over which the efficiency computations are performed, and thus the time horizon over which remedies to the inefficiencies can be presented. Thus, an operator or user must often run entirely separate systems in an attempt to control an agricultural system in a highly efficient manner over a current operation, over operations throughout a current growing season, and operations over future seasons. This can be cumbersome and error prone, and it can be difficult to identify the effects of changes made to a current system that may result in undesirable changes in future operations or seasons.

Thus, the present description describes a system that detects operational sensor inputs and receives optimization criteria and then runs a variable time horizon prediction engine to identify inefficiencies over different, selectable time horizons, and that also provides control signals that can be applied to take remedial actions to remedy those inefficiencies also over the different selectable time horizons. In one example, the variable time horizon prediction engine has a plurality of different time horizon models that each predictively model operation of the agricultural system (or a portion of the agricultural system) over a different time horizon. For example, one time horizon model may model operation performance over a current operation. Another time horizon model may model operation performance over a current season, and another time horizon model may model operation performance over a next or subsequent season. The results or outputs of the different time horizon models can be output to a control system to control portions of the agricultural system or can be displayed or otherwise output or surfaced to an operator or user along with actuators that allow the operator or user to change values of parameters that affect the performance in the different time horizons, or both. An interface can also provide the operator or user with access to the variable time horizon prediction engine to modify time horizon selection, optimization criteria, and parameter values to see the difference in performance over the selected time horizon that may result from changing the parameter values and/or optimization criteria. A time horizon refers to a definable and identifiable span of time. In some examples, a time horizon may be defined by the occurrence of an event, for example, the occurrence of an operation or multiple operations, the occurrence of a season or multiple seasons, as well as various other events. Thus, a time horizon can be a specified amount of time or may rather be whatever amount of time it takes for an event or events to occur.

FIG. 1 is a block diagram of one example of an agricultural system 100 in which agricultural machine 102 is shown in FIG. 1 being operated by operator 103 and is coupled to one or more other machines 104 and/or one or more other computing systems 106 over a network 108. Agricultural machine 102 can be any of a wide variety of different types of agricultural machines, such as a harvester, an application machine (e.g., a machine that applies fertilizer, pesticide, herbicide, etc.), a planting machine, a tillage machine, a tender vehicle, etc. Other machines 104 can be the same type or different types of agricultural machines as agricultural machine 102. Other machines 104 are shown in FIG. 1 as being operated by operator 105 may be performing an agricultural operation at the same time as agricultural machine 102 or at different times. Agricultural machine 102 and other machines 104 may be performing an agricultural operation in the same field, or in different fields. Other computing systems 106 may be a farm manager computing system, a vendor computing system, a manufacturer computing system, or any of a wide variety of other computing systems. Network 108 can be a wide area network, a local area network, a near field communication network, a cellular communication network, or any of a wide variety of other networks or combinations of networks. It should also be noted that operators 103 and 105 can be human operators or autonomous control systems.

Before describing the overall operation of architecture 100, a description of some of the items in architecture 100 and their operation will first be provided. Other computing systems 106 may include one or more processors or servers 110, data store 112, variable time horizon prediction engine 114, user interface subsystem 116, and other computing system functionality 118. User interface subsystem 116 can generate user interfaces for interaction by one or more users 120. User(s) 120 can interact with those user interfaces (or user interface mechanisms) to control and manipulate computing systems 106 and/or portions of agricultural machine 102 and/or portions of agricultural machine 104.

User interface subsystem 116 can include user interface mechanisms that can be used to receive information input by users 120 and provide information output to users 120. Therefore, user interface subsystem 116 can include a display screen, a touch sensitive display screen (where touch enabled operations are provided), a microphone and speaker (where speech recognition and speech synthesis are provided), a point and click device, and other mechanisms for receiving information from users 120 and providing audio, visual, haptic, or other information to users 120. Variable time horizon prediction engine 114 is shown as being deployed on other computing systems 106 but, as is described below, a variable time horizon prediction engine can also, or instead, be deployed on agricultural machine 102 or other machine 104 or elsewhere. In addition, a variable time horizon prediction engine can be disbursed among the items in agricultural system 100. In the example shown in FIG. 1, variable time horizon prediction engine 114 illustratively receives inputs and generates an output showing how operation performance may be improved in the operation of agricultural machine 102 (and/or other machines 104) over different selectable time horizons. The variable time horizon prediction engine can receive inputs from agricultural machine 102 and/or other machines 104 as well as from other sources to generate its output. Variable time horizon prediction engine 114 is described in greater detail below.

In the example shown in FIG. 1, agricultural machine 102 includes one or more processors or servers 122, and data store 124 which may include user/operator profile information 126, and other information 128. The user/operator profile information 126 may, include operator identification information 130, operator preference information 132, goal data 134, and other items 136. Agricultural machine 102 can also include machine operation sensors 138, operator identification/authentication system 140, communication system 142, variable time horizon prediction engine 144, control system 146, controllable subsystems 148, and other agricultural machine functionality 150.

Machine operation sensors 138 can include a wide variety of different types of sensors that sense a wide variety of different types of machine operations or variables. Some sensors are described below with respect to FIG. 4 in an example in which agricultural machine 102 is a harvester. Therefore, machine operation sensors 138 can sense the geographic position, heading, and speed of agricultural machine 102. Machine operation sensors 138 can also include a plurality of different sensors for sensing characteristics of the terrain and soil over which agricultural machine is traveling, the crop conditions or other conditions under which agricultural machine 102 is operating, as well as different characteristics regarding the performance of agricultural machine 102, and the performance of one or more of the controllable subsystems 148 of agricultural machine 102.

Operator identification/authentication system 140 may receive one or more inputs from operator 103 and identify operator 103, authorize operator 103 to operate agricultural machine 102 (or to perform a subset of operations on agricultural machine 102), and to authenticate operator 103. The authentication system used to authenticate operator 103 may include a wide variety of different types of authentication, such as authentication using a personal identification number (PIN), biometric authentication, two-factor authentication, or any of a wide variety of other types of authentication.

Communication system 142 facilitates the communication of the items in agricultural machine 102 with one another, and the communication of agricultural machine 102 over network 108. Therefore, communication system 142 may include a controller area network (CAN) bus and bus controller, as well any communication functionality that is needed to communicate over network 108. Therefore, depending on the type of network 108, the functionality in communication system 142 may vary.

Variable time horizon prediction engine 144 can include trigger detector 149, current operation performance model 150, current season performance model 152, next season performance model 154, and other time horizon performance model 156.

Trigger detector 149 illustratively detects when a trigger occurs to run variable time horizon prediction engine 144 and generate outputs predicting or estimating the performance of agricultural system 100 (or individual or collective portions of agricultural system 100) using different parameter values. For instance, trigger detector 149 may detect an input from operator 103 or user 120 indicating that variable time horizon prediction engine 144 is to process inputs and generate an output. Variable time horizon prediction engine 144 may be configured to run and generate an output when certain operating thresholds are met. For instance, if the fuel efficiency of agricultural machine 102 drops below a threshold value, then this may trigger variable time horizon prediction engine 144 to generate an output indicating how the operation of agricultural machine 102 should be changed in order to keep the fuel efficiency above the threshold value. These are just two examples of different triggers that can be detected by trigger detector 149.

Current operation performance model 150 receives sensor inputs from machine operation sensors 138 and identifies or characterizes the current operation performance of agricultural machine 102 in terms of performance criteria that may be selected, such as efficiency, fuel efficiency, grain loss, time-to-finish, or other performance criteria. Current operation performance model 150 can also receive modified parameter value inputs and predict how the performance of agricultural machine 102 will change during a current operation, if the modified parameter values are used. Therefore, operator 103 can see how agricultural machine 102 will perform if the settings are changed, if speed is changed, or if any of the variable parameters are changed, by modifying the parameter value as desired and observing the output from current operation performance model 150. Current season performance model 152 models the performance of agricultural machine 102 and/or any other machines 104 performing other operations in the current field over the current season. Operator 103 or other users can also provide modified parameter values to current season performance model 152 which reflect changes in various parameter values that can be made by operator 103 or other users. Running model 152 using the modified parameter values allows the operator 103 or other users to see how the performance of agricultural system 100 or portions of agricultural system 100 will change if the parameter values are modified.

By way of example, assume that, during the current growing season, the current field is scheduled to be sprayed with herbicide once. However, assume also that operator 103 wishes to determine how the field will perform if the frequency with which the field is sprayed is increased to twice or three times during the current growing season. In that case, operator 103 can provide an input to increase a parameter value that sets the frequency with which the field is sprayed and run current season performance model 152. Model 152 can then generate an output indicative of the performance of the current field if it is sprayed more than once. By way of example, current season performance model 152 may generate an output indicating the yield of the current field. If the operator 103 increases the spraying frequency from once to twice during the current growing season, then current season performance model 152 will provide an output indicating how the yield will change under the new conditions (where the field is sprayed twice instead of once). This is just one example, and the parameters that operator 103 can modify to determine how the performance of the field will change during a current season can vary widely as well. Other examples of such parameters are described below.

Next season performance model 154 generates an output indicative of how the field (or agricultural system 100) will perform over a time horizon that extends beyond the current season, into the next season (or subsequent seasons). Operator 103 can also provide modified parameter values to next season performance model 154 to see how the field (or agricultural system 100) would perform under different conditions. By way of example, operator 103 may provide an input to next season performance model 154 indicating that operator 103 will be adding an extra grain cart to the operation. This may allow the field to be harvested more quickly, but it may also result in higher fuel consumption (because a tractor will need to pull the extra grain cart). Therefore, next season performance model 154 can generate an output indicative of the performance of the field next season if operator 103 adds an additional grain cart. This is just one example of a parameter value that operator 103 can modify for use by next season performance model 154.

Control system 146 can include control signal engine 158, control signal application logic 160, and other items 162. Control signal engine 158 receives the output from variable time horizon prediction engine 144 and can also receive inputs from other items as well. Control signal engine 158 then identifies a control signal that is to be generated based upon those inputs. Control signal application logic 160 applies the control signal to one of controllable subsystems 148, or to other items, as needed. As an example, assume that operator 103 wishes to see what will happen to the performance of agricultural machine 102 during the current operation if the operator 103 increases the speed of agricultural machine 102. In that case, operator 103 provides an input to current operation model 150 along with a modified parameter value that indicates the speed of agricultural machine 102 will increase by one mile per hour. Then, assume also that the variable time horizon prediction engine 144 runs the current operation performance model 150 with the new increased speed (as the modified time horizon-specific parameter value) and generates an output showing that the fuel efficiency of agricultural machine 102 in harvesting the field will increase if the speed is increased by one mile per hour. In that case, control signal engine 158 can generate a control signal to control the controllable subsystems 148 to display the result output by variable time horizon prediction engine 144 to operator 103. Operator 103 may see that, if the operator increases the speed of agricultural machine by one mile per hour, the fuel efficiency in harvesting the field will also increase. Therefore, operator 103 may provide an input confirming that the speed of agricultural machine 102 should be increased by one mile per hour. Control signal application logic 160 can then control one of the controllable subsystems 148 to increase the machine speed by one mile per hour.

The controllable subsystems 148 may include such things as operator interface subsystem 164, propulsion subsystem 166, steering subsystem 168, path planning subsystem 170, material handling subsystem 172, logistics subsystem 174, and other items 176. Operator interface subsystem 164 can include mechanisms by which operator 103 can provide inputs to agricultural machine 102, and mechanisms by which information can be provided to operator 103. Therefore, operator interface subsystem 164 can include a steering wheel, pedals, a joystick, linkages or levers, buttons, knobs, etc. In addition, operator interface subsystem 164 can include a display screen for displaying information to operator 103. The display screen may display user-actuatable mechanisms that can be actuated by operator 103 to provide control inputs to agricultural machine 102. The actuatable mechanisms may include icons, links, buttons, menus, etc. The actuatable mechanisms can be actuated using touch gestures (where the display screen is a touch screen), using a point and click device, using voice commands, etc.

Propulsion subsystem 166 can include mechanisms that provide power to propel agricultural machine 102. Therefore, propulsion subsystem 166 can include a motor or engine, a transmission (where the motor or engine is not a direct drive motor), ground-engaging elements such as wheel or tracks, gears, etc. The speed of propulsion of agricultural machine 102 can be varied by controlling a throttle or other input that varies the speed of operation of propulsion subsystem 166, or the gear ratio in a transmission, or other mechanisms that are used to vary the speed of agricultural machine 102.

Steering subsystem 168 can include mechanisms that are used to steer agricultural machine 102. Such mechanisms can include steerable wheels, wheels or tracks or other ground-engaging elements that are controlled in a skid steer fashion, or other steerable mechanisms.

Path planning subsystem 170 can be used to identify a path or route for agricultural machine 102 through a field. Path planning subsystem 170 can generate the path or route based on a wide variety of input information, such as soil conditions, yield, other field or operating conditions, or a wide variety of other inputs. Path planning subsystem 170 can generate an output that is used to manually or semi-automatically or automatically control steering subsystem 168 to navigate agricultural machine 102 through the path or route.

Material handling subsystem 172 can include a wide variety of different mechanisms that handle different material in agricultural machine 102. For instance, in an example where agricultural machine 102 is a harvester, the material handling subsystem can include a cutter, feeder house, augers, elevators, fans, and a wide variety of other material handling mechanisms. The material handling mechanisms move the material into, through, and out of agricultural machine 102.

Logistics subsystem 174 illustratively receives inputs and generates an output indicative of desired logistics. The logistics may include such things as which field agricultural machine 102 is to harvest, the order the fields are to be harvested, the number of pieces of equipment that are to be assigned to a particular field (such as the number of harvesters, the number of grain carts, etc.), the location where a semi-truck or other vehicle that may be used to transport harvested material to another location should be parked in the field or adjacent the field, the time when the various pieces of equipment are to arrive at the field and to change position in the field, etc. The logistics subsystem 174 can receive a wide variety of different inputs and generate outputs indicating logistical information that can be used by operator 103 or operator(s) 105 or user(s) 120 in performing operations, in order to optimize the operation in terms of logistical criteria (such as cost per unit of material harvested, speed of harvest, fuel efficiency, etc.

Figure 2A:
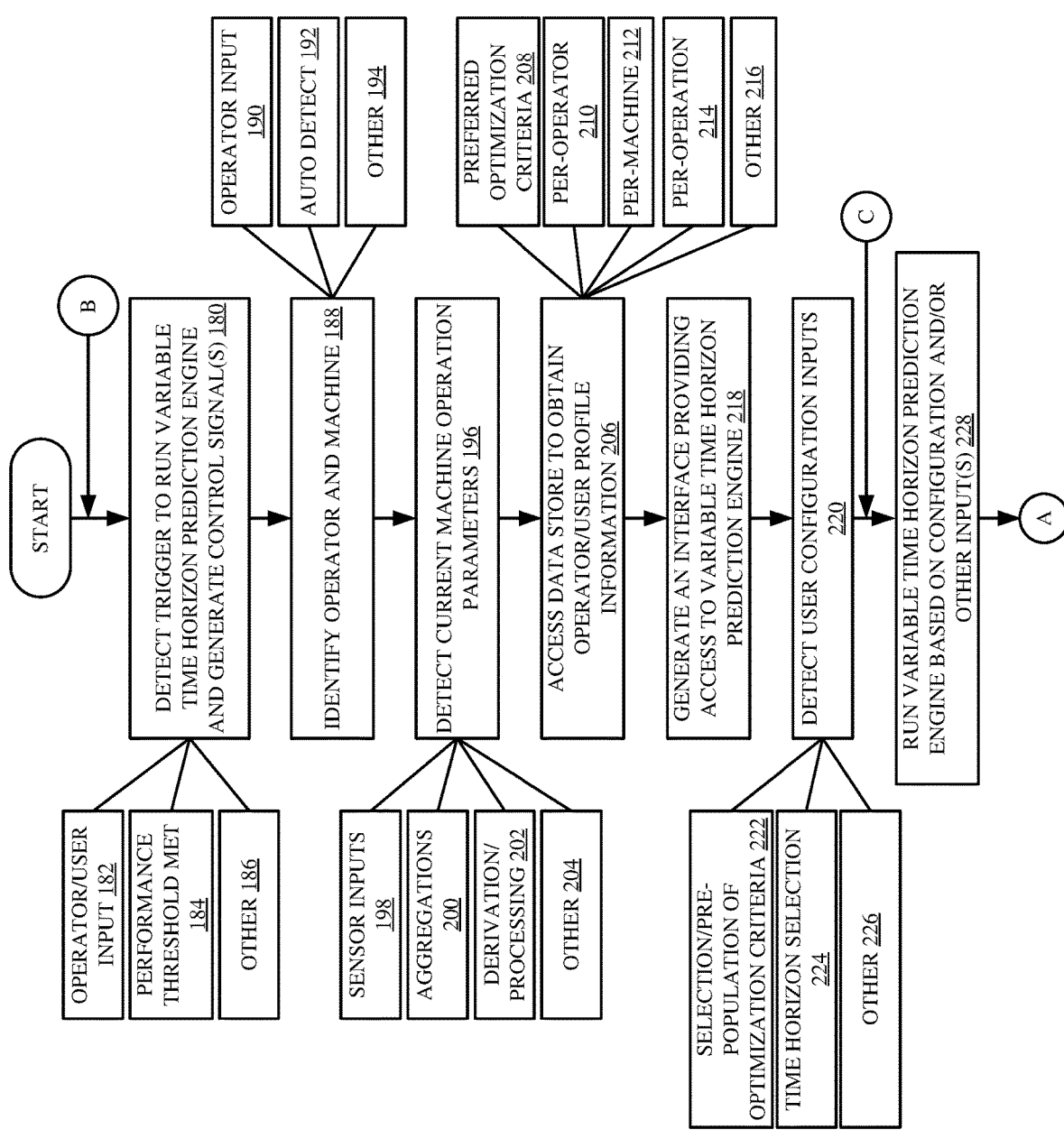
FIGS. 2A and 2B (collectively referred to herein as FIG. 2) show a flow diagram illustrating one example of the operation of an agricultural system.
Figure 2B:
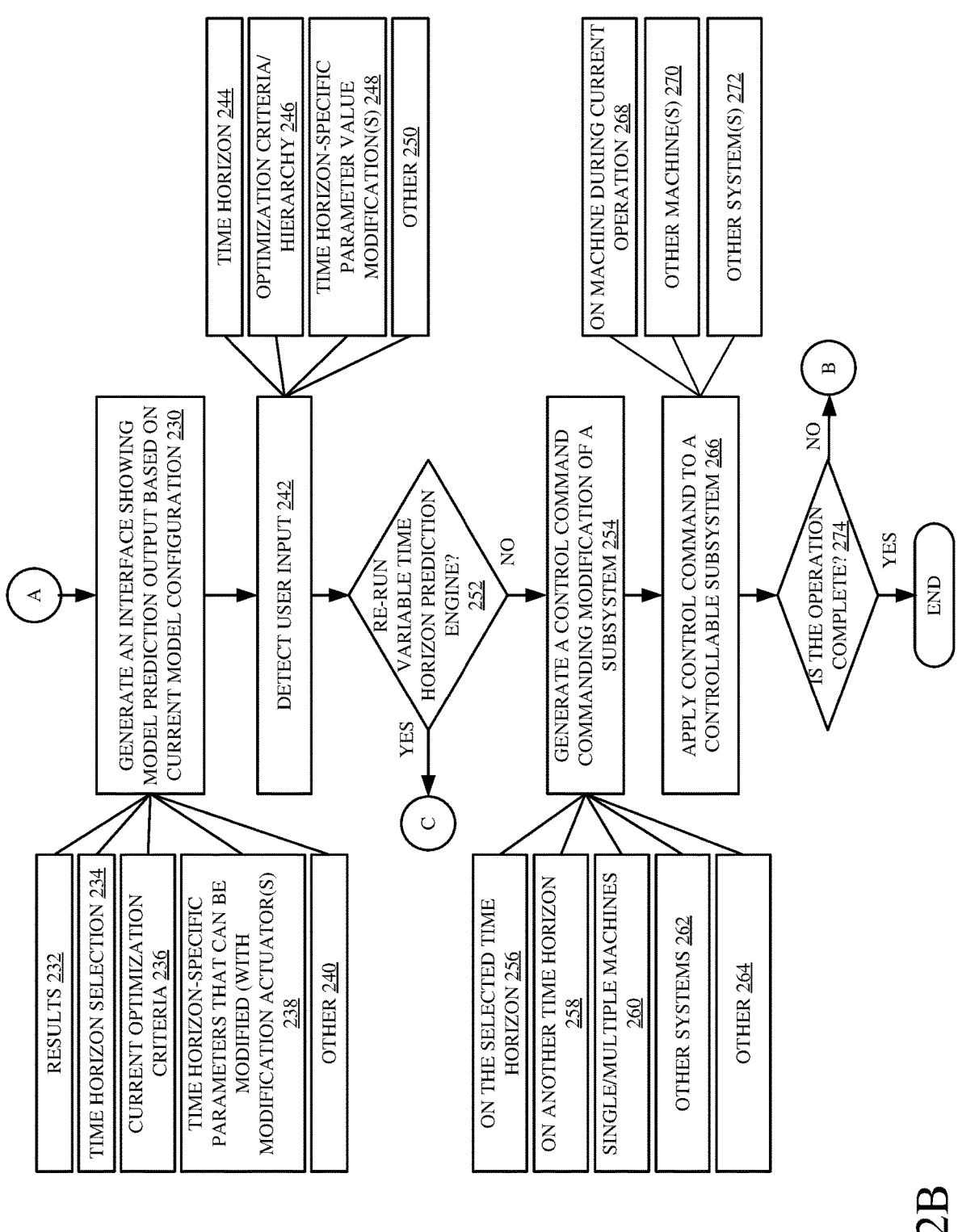

FIGS. 2A and 2B (collectively referred to herein as FIG. 2) show a flow diagram illustrating one example of the operation of agricultural system 100 in using variable time horizon prediction engine 144 to control the operation of agricultural system 100 under different conditions or using different settings or other parameter values, over a variety of different selectable time horizons.

It is first assumed that trigger detector 149 detects a trigger indicating that variable time horizon prediction engine 144 is to run and that control system 146 is to generate control signals based upon the output of variable time horizon prediction engine 144. Detecting the trigger is indicated by block 180 in the flow diagram of FIG. 2. The trigger may be an operator or user input 182. The trigger may be that a performance threshold has been met in the operation of agricultural machine 102, as indicated by block 184. There may be a wide variety of other triggers 186 as well.

Operator identification/authentication system 140 may identify operator 103 as well as agricultural machine 102, if that has not already been done. Identifying the operator 103 and/or agricultural machine 102 is indicated by block 188 in the flow diagram of FIG. 2. The operator and/or machine may be identified based on an operator input 190, based upon automated detection 192 (such as biometric detection), or in other ways 194.

Current operation model 150 then receives current machine operating parameters, as indicated by block 196. The current machine operating parameters may include sensor inputs 198 from machine operation sensors 138, aggregations 200 (such as where the values of machine operation sensors 138 are averaged, or aggregated in other ways), and derivations or other processed values 202 that include values derived from the sensor inputs from machine operation sensors 138 or other inputs or values obtained by processing those or other inputs in other ways. The current machine operation parameters can be detected in other ways as well, as indicated by block 204.

Current operation model 150 then accesses data store 124 to obtain operator or user profile information, as indicated by block 206. The profile information may include optimization criteria that are preferred by operator 103, as indicated by block 208. For instance, when variable time horizon prediction engine 144 generates an output to optimize the performance of agricultural machine 102 or agricultural system 100, the optimization is made according to certain optimization criteria. Those criteria may include performance criteria, such as efficiency, in which case the operation is optimized for efficiency. The optimization criteria may include performance criteria, such as speed, in which case the operation is optimized for speed. The optimization criteria may include performance criteria, such as loss, in which case the operation is optimized to reduce loss (e.g., grain loss). Optimization criteria may include various other performance criteria which are to be optimized, for example, but not by limitation, cost, profit, fuel usage, time to complete, as well as various other performance criteria. The optimization criteria may define a performance criteria which is to be optimized. For example, the performance criteria to be optimized may be fuel efficiency. The optimization criteria may also define how the optimization is to be achieved, for example, the optimization criteria may define a range of values or a threshold value and thus optimizing may include generating a value for a select performance criteria within the range of values or with respect to the threshold value. In other examples, the optimization criteria may define that optimization comprises achieving the maximum possible value (or a value as close to the maximum possible value as possible) for a select performance criteria, in which case, the operation is configured to achieve the maximum possible value (or a value as close to the maximum possible value as possible) for a given performance criteria (e.g., the maximum possible fuel efficiency). In some cases, the optimization criteria may define achieving the maximum possible value for a given performance criteria while maintaining one or more other performance criteria within a range of values or with respect to a given threshold. For example, the optimization criteria may define that the performance criteria fuel efficiency is to be maximized to the greatest extent while maintaining the performance criteria harvester speed at or below/above a select speed or within a range of speeds. In other examples, the optimization criteria may define a range of values or a threshold value for a plurality of performance criteria and the operation of the machine is configured based thereon. In some examples, the optimization criteria may establish a priority (or hierarchy) of each performance criteria. For example, it may not be possible to operate the machine such that each performance criteria satisfies a threshold value or is within a select range of values. Thus, each performance metric may be given priority such that machine will be configured to optimize one or more performance criteria over one or more other criteria. In other examples, where not all of the performance criteria can be within a select range or cannot satisfy a select threshold, the machine may be configured to place one or more preferred performance criteria within a range of values or meeting a select threshold value while achieving the best possible value for each other performance criteria. These are merely some examples. Operator 103 may have preferences indicated in his or her profile information that identify the optimization criteria that this particular operator 103 prefers. Therefore, the optimization criteria may be arranged in data store 124 on a per-operator basis 210. In addition, operator 103 may at times operate different agricultural machines, other than agricultural machine 102. For instance, an agricultural system 100 may have multiple different harvesters, tractors, and other equipment, and it may be that operator 103 operates different pieces of equipment at different times. Therefore, operator 103 may have preferred optimization criteria when operating a harvester, but different preferred optimization criteria when operating a sprayer. Thus, the optimization criteria in data store 124 may be arranged of a per-machine basis 212. Similarly, even if operator 103 is operating the same agricultural machine 102, operator 103 may have different preferred optimization criteria depending on the operation being performed. For instance, operator 103 may have a first set of preferred optimization criteria when harvesting corn, and a second set of preferred optimization criteria when harvesting wheat. Thus, the optimization criteria stored in data store 124 may be arranged on a per-operation basis as well, as indicated by block 214. The optimization criteria or other operator or user profile information may be arranged in other ways, and the profile information may include other information as well, as indicated by block 216.

Control system 146 may then control operator interface subsystem 164 to generate an interface that provides operator 103 with access to variable time horizon prediction engine 144. One example of an interface is described below with respect to FIG. 3. The interface may allow operator 103 to adjust the optimization criteria, or other input values that variable time horizon prediction engine 144 will use in generating a predictive output. Generating an interface providing access to variable time horizon prediction engine 144 is indicated by block 218 in the flow diagram of FIG. 2.

Operator 103 may configure the variable time horizon prediction engine 144 through the generated interface. Detecting user configuration inputs is indicated by block 220 in the flow diagram of FIG. 2. The user interface may display the optimization criteria that are going to be used by variable time horizon prediction engine 144 in the absence of any user changes. Thus, when variable time horizon prediction engine 144 obtains the operator preferences from data store 124, those preferences may be prepopulated into the interface that is generated and presented to operator 103. In addition, operator 103 may select other optimization criteria or other values through the interface as well. Selecting and prepopulating optimization criteria through the interface is indicated by block 222 in the flow diagram of FIG. 2.

Operator 103 may also select a time horizon for which variable time horizon prediction engine 144 is to be run. Selecting the time horizon as one of the user configuration inputs is indicated by block 224 in the flow diagram of FIG. 2. In some examples, it may be that the operator 103 selects more than one time horizon for which variable time horizon prediction engine 144 is to be run. In some examples, it may be that the variable time horizon prediction engine 144 is set to run one or more of the time horizons by default unless the operator provides specific selection of one or more time horizons. For instance, the variable time horizon prediction engine 144 may, by default, run for a current operation time horizon, a current season time horizon, and a subsequent season(s) time horizon, unless otherwise specified by operator selection. The operator or user may provide a wide variety of other configuration inputs that are detected by variable time horizon prediction engine 144 as well, as indicated by block 226.

Variable time horizon prediction engine 144 then runs one or more of the models 150-156 based upon the configuration inputs received from operator 103 through the interface and/or from data store 124 and/or from other sources. Running the variable time horizon prediction engine 144 based upon the configuration inputs is indicated by block 228 in the flow diagram of FIG. 2.

The particular model 150-156 (or combination of models) then generates an output indicative of the predicted or estimated performance of the agricultural system 100 according to the selected time horizon(s), The output from one or more of models 150-156 is provided to control system 146. Control system 146 controls operator interface subsystem 164 to generate an interface showing the model prediction or estimation output based upon the current configuration of the models 150-156 in variable time horizon prediction engine 144. Generating an interface showing the model output is indicated by block 230 in the flow diagram of FIG. 2.

The interface can include the results of running the variable time horizon prediction engine 144 and one or more of the different time horizon models 150-156. Displaying the results or otherwise outputting the results on an interface is indicated by block 232 in the flow diagram of FIG. 2.

The interface can also display the particular time horizon that was selected (such as the current operation, the current season, next season, etc.). Showing the selected time horizon is indicated by block 234 in the flow diagram of FIG. 2. The interface may also show the current optimization criteria which were used in running the model(s). Displaying the current optimization criteria is indicated by block 236 in the flow diagram of FIG. 2.

The interface can also show the time horizon-specific parameters that can be modified along with modification actuators that can be actuated by the operator or user to modify the time horizon-specific parameters so that the model can be rerun on the modified values to show the operator how the operation of agricultural machine 102 and/or agricultural system 100 would change when using the modified values of the time horizon-specific parameters. Showing the time horizon-specific parameters that can be modified, along with modification actuators, on the display is indicated by block 238 in the flow diagram of FIG. 2. The interface can include a wide variety of other information as well, as indicated by block 240.

The operator interface system 164 then detects user inputs on the interface and provides them back to other components in agricultural machine 102, as needed. Detecting user inputs through the interface is indicated by block 242 in the flow diagram of FIG. 2.

For instance, the operator 103 can select a different time horizon, as indicated by block 244. The new time horizon can then be provided back to variable time horizon prediction engine 144 so that the time horizon model 150-156 corresponding to the newly selected time horizon can be run.

The user inputs may be a change or modification to the optimization criteria upon which the time horizon model was run. Also, where multiple optimization criteria are arranged hierarchically, the input may include reordering the hierarchy of optimization criteria so that the time horizon model may be rerun based upon the modified optimization criteria or the modified hierarchy of optimization criteria. Detecting modification of the optimization criteria or a hierarchy in which they are arranged is indicated by block 246 in the flow diagram of FIG. 2.

The detected user inputs can be user modifications of the time horizon-specific parameter values using the modification actuators discussed above. Detecting modifications to the time horizon-specific parameters values is indicated by block 248 in the flow diagram of FIG. 2. A wide variety of other user inputs can be detected, as indicated by block 250.

If the variable time horizon prediction engine 144 determines that it needs to rerun one or more of the time horizon models 150-156, based upon the user inputs, then the variable time horizon prediction engine 144 reruns the model. Determining whether the model is to be rerun is indicated by block 252. If so, processing reverts to block 228 in FIG. 2 where the variable time horizon prediction engine 144 is run based upon the new or modified configuration inputs from the operator or user.

The output of variable time horizon prediction engine 144 can be output to control system 146 which generates a control command commanding modification of a controllable subsystem 148. Generating a control command is indicated by block 254 in the flow diagram of FIG. 2. The command can be to command a controllable subsystem 148 to modify operation during the selected time horizon, as indicated by block 256. The command can be to modify operation during another time horizon, as indicated by block 258. The command can be made to agricultural machine 102 or any of the other machines 104, or to multiple machines at the same time, as indicated by block 260. The command can be to modify other computing system 106, such as a logistics computing system or another system, as indicated by block 262. The command can be output to modify operations in other ways as well, as indicated by block 264. Once the control command is generated, control signal application logic 160 applies the control command to a controllable subsystem, as indicated by block 266. Again, the control command can be applied to the current machine during a current operation, as indicated by block 268 or to other machines or other systems as indicated by blocks 270 and 272, respectively. Until the operation is complete, as determined at block 274, operation reverts to block 180 where the system may wait for another trigger to run the variable time horizon prediction engine 144.

Figure 3:
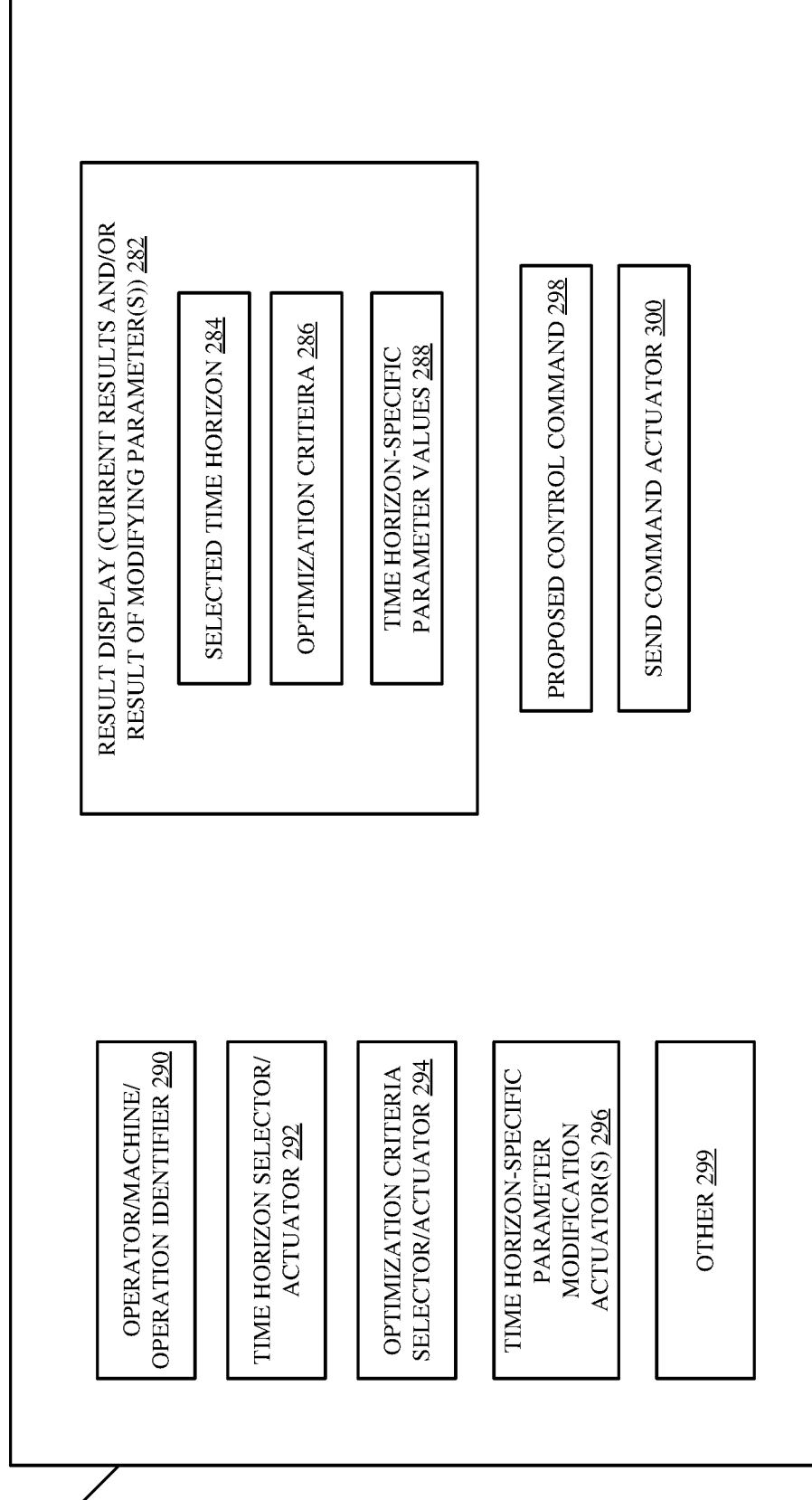
FIG. 3 is a block diagram showing one example of an interface.

FIG. 3 is a block diagram showing an illustration of one example of a user interface display 280 that can be generated to show an indication of the output of variable time horizon prediction engine 144. In the example shown in FIG. 3, display 280 includes a result display section 282 that displays the results of running the current operation model 150 thus showing a current operation relative to optimization criteria. The results section 282 may also show the results of running one of the time horizon models 150-156 in variable time horizon prediction engine 144, based upon user configuration inputs. The results display 282 may show examples of control commands or control adjustments that may be made to further optimize the operation of agricultural system 100. The results may be ranked in terms of modifications that are easiest to make. For instance, it is easier to increase the speed of a fleet of harvesters then to upgrade the fleet of harvesters to a newer model of harvesters. The results may be displayed to show control commands that have the highest positive impact on the performance of the agricultural system 100 according to the optimization criteria. The results may be ranked by the cost of the control commands. The results may be displayed to show all of this information, such as which control commands are the easiest to implement, which control commands have the highest positive impact, which controls have the lowest costs, etc. The results can be generated to display a wide variety of other information as well. The display section 282 can display the selected time horizon 284, the optimization criteria 286, and the time horizon-specific parameter values 288 that were used in generating the results. Display 280 may also include an operator/machine/operation identifier section 290 that may identify the operator 103, the particular agricultural machine 102, and the operation being performed. Display 280 may also include a time horizon selector or actuator 292. The time horizon selector or actuator 292 may include a user actuatable mechanism that allows the user to select one or more of the different time horizons for which to obtain results.

Display 280 can also display optimization criteria selector/actuator 294 which allows the operator to select optimization criteria for running the variable time horizon prediction engine 144. The optimization criteria selector/actuator 294 may also allow the operator to arrange the optimization criteria hierarchically so that variable time horizon prediction engine 144 can generate an output that optimizes the agricultural system 100 according to the highest priority optimization criteria in the hierarchy and then according to the second highest prioritization criteria, and so forth, for each of the optimization criteria listed in the hierarchy.

Display 280 can also include time horizon-specific parameter modification actuators 296. For each selectable time horizon, there may be specific parameters that can be used in running the variable time horizon prediction engine 144. For instance, the particular parameters that may be varied when the current operation time horizon is selected may be different than the parameters that can be varied when the current season time horizon is selected. The parameters may be different still when the future season time horizon is selected. Therefore, time horizon-specific parameter modification actuators 296 can be displayed so that the operator can modify the parameter values for the particular parameters that can be used with the selected time horizon that is selected using time horizon selector/actuator 292. If the user then goes back and selects a different time horizon, the time horizon-specific parameter modification actuators 296 may change to allow the operator to modify the values of the parameters specific to the newly selected time horizon.

Display 280 can also include a proposed control command display section 298. For instance, once variable time horizon prediction engine 144 generates an output indicating how the agricultural system 100 can be controlled in order to further optimize its operation, control signal engine 158 can identify the particular control signals that need to be generated to carry out the optimized operation. The control signals may control the operation of agricultural machine 102. The control signals may control the operation of other machines 104 or of other computing systems 106. The control signals may control the operation of a logistics computing system, or any of a wide variety of other systems. Proposed control command 298 shows a control command which, if carried out, would cause the control signals to be generated and applied against the controllable subsystems.

Display 280 may also include a send command actuator 300 that can be actuated by the operator or user to implement the proposed control command 298. For instance, assume there are two harvesters (harvesters A and B) operating. Assume further that the proposed control command for a current operation time horizon may be "increase the speed of both harvesters A and B by 1 mile per hour". In that case, the operator or user may actuate the SEND command actuator 300 and a control command will then be sent to harvesters A and B to increase their speed by 1 mile per hour.

The control command may be an automated control command in which case the speed of those two harvesters is automatically increased by 1 mile per hour, or it may be a communication command in which case the control command may be displayed to the operator of harvester A and to the operator of harvester B indicating that they are to increase the travel speed of their corresponding harvesters by 1 mile per hour.

If the proposed control command is a command for a logistics subsystem, the control command may command the logistics subsystem to upgrade a harvester and add a grain cart to the fleet of machines in agricultural system 100 for the following harvesting season. If the proposed control command is for a subsequent operation during the current season, the proposed control command may be to schedule an additional application of commodity to the field, or the proposed control command may specify a certain type of commodity that is to be applied during a spraying operation, etc.

Figure 4:
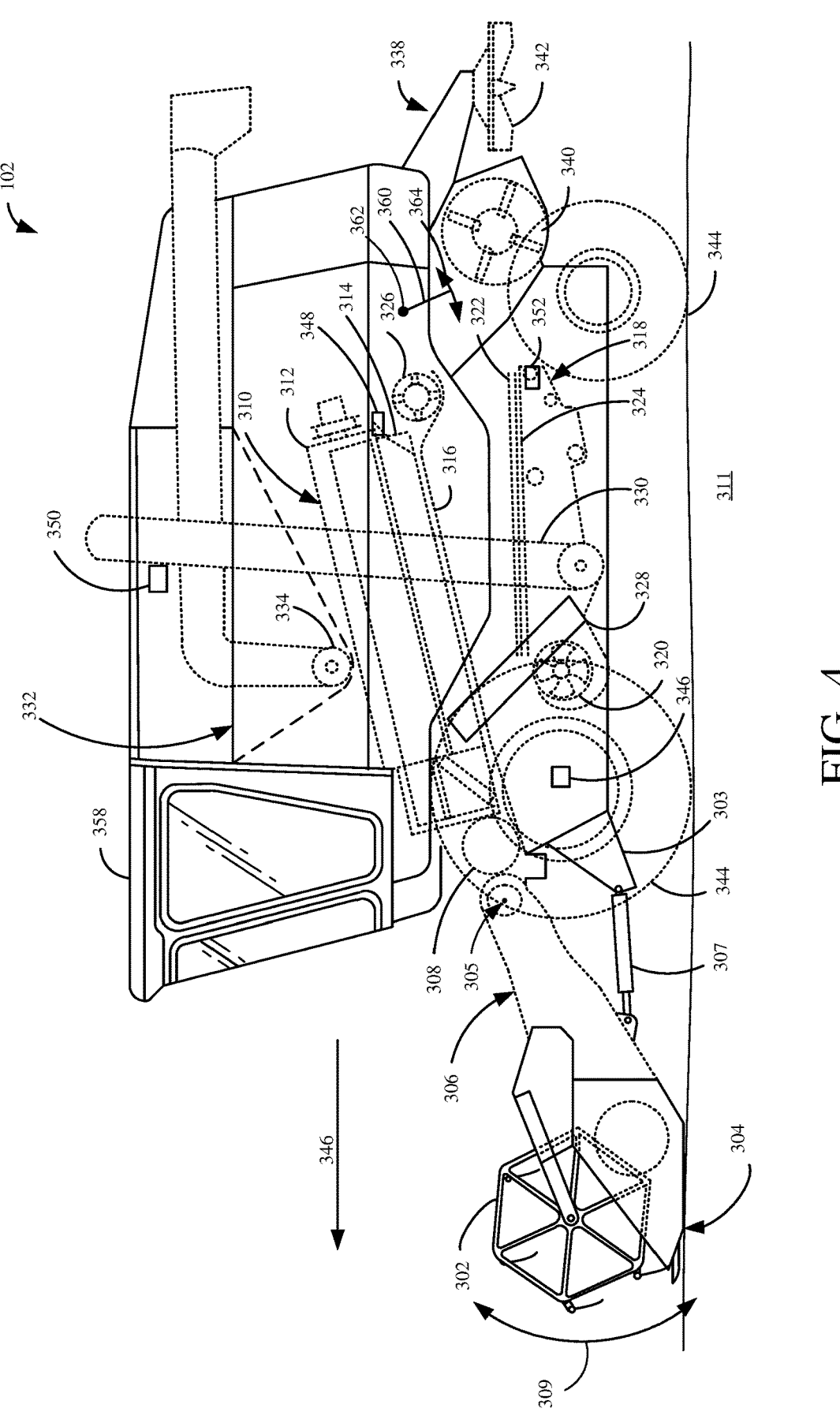
FIG. 4 is a partial pictorial, partial schematic illustration of a self-propelled agricultural harvester that represents one example of an agricultural machine.

FIG. 4 is a partial pictorial, partial schematic, illustration of a self-propelled agricultural harvesting machine 102, in an example where machine 102 is a combine harvester (or combine). It can be seen in FIG. 4 that combine 102 illustratively includes an operator compartment 301, which can have a variety of different operator interface mechanisms, for controlling combine 102. Combine 102 can include a set of front end equipment that can include header 302, and a cutter generally indicated at 304. Combine 102 can also include a feeder house 306, a feed accelerator 308, and a thresher generally indicated at 310. Header 302 is pivotally coupled to a frame 303 of combine 102 along pivot axis 305. One or more actuators 307 drive movement of header 302 about axis 305 in the direction generally indicated by arrow 309. Thus, the vertical position of header 302 above ground 311 over which it is traveling can be controlled by actuating actuator 307. While not shown in FIG. 4, it may be that the tilt (or roll) angle of header 302 or portions of header 302 can be controlled by a separate actuator. Tilt, or roll, refers to the orientation of header 302 about the front-to-back longitudinal axis of combine 102.

Thresher 310 illustratively includes a threshing rotor 312 and a set of concaves 314. Further, combine 102 can include a separator 316 that includes a separator rotor. Combine 102 can include a cleaning subsystem (or cleaning shoe) 318 that, itself, can include a cleaning fan 320, chaffer 322 and sieve 324. The material handling subsystem in combine 102 can include (in addition to a feeder house 306 and feed accelerator 308) discharge beater 326, tailings elevator 328, clean grain elevator 330 (that moves clean grain into clean grain tank 332) as well as unloading auger 334 and spout 336. Combine 102 can further include a residue subsystem 338 that can include chopper 340 and spreader 342. Combine 102 can also have a propulsion subsystem that includes an engine that drives ground engaging wheels 344 or tracks, etc. It will be noted that combine 102 may also have more than one of any of the subsystems mentioned above (such as left and right cleaning shoes, separators, etc.).

In operation, and by way of overview, combine 102 illustratively moves through a field in the direction indicated by arrow 346. As combine 102 moves, header 302 engages the crop to be harvested and gathers it toward cutter 304. The operator illustratively sets a height setting for header 302 (and possibly a tilt or roll angle setting) and a control system controls actuator 307 (and possibly a tilt or roll actuator—not shown) to maintain header 302 at the set height above ground 311 (and at the desired roll angle). The control system responds to header error (e.g., the difference between the set height and measured height of header 304 above ground 311 and possibly roll angle error) with a responsiveness that is determined based on a set sensitivity level. If the sensitivity level is set high, the control system responds to, smaller header position errors, and attempts to reduce them more quickly than if the sensitivity is set lower.

After the crop is cut by cutter 304, it is moved through a conveyor in feeder house 306 toward feed accelerator 308, which accelerates the crop into thresher 310. The crop is threshed by rotor 312 rotating the crop against concaves 314. The threshed crop is moved by a separator rotor in separator 316 where some of the residue is moved by discharge beater 326 toward the residue subsystem 338. Residue can be chopped by residue chopper 340 and spread on the field by spreader 342. In other configurations, the residue is simply chopped and dropped in a windrow, instead of being chopped and spread.

Grain falls to cleaning shoe (or cleaning subsystem) 318. Chaffer 322 separates some of the larger material from the grain, and sieve 324 separates some of the finer material from the clean grain. Clean grain falls to an auger in clean grain elevator 330, which moves the clean grain upward and deposits it in clean grain tank 332. Residue can be removed from the cleaning shoe 318 by airflow generated by cleaning fan 320. Cleaning fan 320 directs air along an airflow path upwardly through the sieves and chaffers and the airflow carries residue can also be rearwardly in combine 102 toward the residue handling subsystem 338.

Tailings can be moved by tailings elevator 328 back to thresher 110 where the tailings can be re-threshed. Alternatively, the tailings can also be passed to a separate re-threshing mechanism (also using a tailings elevator or another transport mechanism) where the tailings can be re-threshed as well.

FIG. 4 also shows that, in one example, combine 102 can include sensors 138 which may include ground speed sensor 347, one or more separator loss sensors 348, a clean grain camera 350, and one or more cleaning shoe loss sensors 352. Ground speed sensor 346 illustratively senses the travel speed of combine 102 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 352 illustratively provide an output signal indicative of the quantity of grain loss by both the right and left sides of the cleaning shoe 318. In one example, sensors 352 are impact sensors which count grain strikes per unit of time (or per unit of distance traveled) to provide an indication of the cleaning shoe grain loss. The impact sensors for the right and left sides of the cleaning shoe can provide individual signals, or a combined or aggregated signal. It will be noted that sensors 352 can comprise only a single sensor as well, instead of separate sensors for each shoe.

Separator loss sensor 348 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensors 138 may include other sensor and measurement mechanisms (in addition to or instead of the sensors already described) which can include other sensors on combine 102 as well. For instance, they can include a header height sensor that senses a height of header 302 above ground 311. The sensors can include stability sensors that sense oscillation or bouncing motion (and amplitude) of combine 102. They can include a residue setting sensor that is configured to sense whether machine 102 is configured to chop the residue, drop a windrow, etc. The sensors can include cleaning shoe fan speed sensors that can be configured proximate fan 320 to sense the speed of the fan. The sensors can include a threshing clearance sensor that senses clearance between the rotor 312 and concaves 314. The sensors can include a threshing rotor speed sensor that senses a rotor speed of rotor 312. The sensors can include a chaffer clearance sensor that senses the size of openings in chaffer 322. The sensors can include a sieve clearance sensor that senses the size of openings in sieve 324. The sensors can include a material other than grain (MOG) moisture sensor that can be configured to sense the moisture level of the material other than grain that is passing through combine 102. The sensors can include machine setting sensors that are configured to sense the various configurable settings on combine 102. The sensors can also include a machine orientation sensor that can be any of a wide variety of different types of sensors that sense the orientation of combine 102. Crop property sensors can sense a variety of different types of crop properties, such as crop type, crop size (e.g., stalk width), crop moisture, and other crop properties. The sensors can also be configured to sense characteristics of the crop as they are being processed by combine 102. For instance, the sensors can sense grain feed rate (e.g., mass flow rate), as the grain travels through clean grain elevator 330, or provide other output signals indicative of other sensed variables. Environment sensors can sense soil moisture, soil compaction, weather (which may be sensed or downloaded), temperature, standing water, and other properties of the soil, crop, machine or environment. Some additional examples of the types of sensors that can be used are described elsewhere.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

The present description thus describes a system in which a variable time horizon prediction engine can be easily accessed by an operator or user, and a time horizon can be selected. The variable time horizon prediction engine takes inputs that may include parameter values indicative of parameters of an operation on a selected time horizon and goals or optimization criteria. The goals or optimization criteria may be operator-specific or user-specific default values or automatically generated values. The variable time horizon prediction engine then generates an output that can be used to identify a control command. The control command may be a command that can be made to control a controllable subsystem or an agricultural system to improve the performance of the agricultural system or different components within the agricultural system by more closely optimizing the operation of the agricultural system based upon the optimization criteria. An interface is generated that allows an operator or user to select a time horizon for optimization and to modify time horizon-specific parameter values to determine whether value modifications will result in improved performance in the selected time horizon.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of, the other components or items in those systems.

Also, a number of user interface displays have been discussed. The interface displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, the mechanisms can be actuated using touch gestures. Also, where the device that displays them has speech recognition components, the mechanisms can be actuated using speech commands.

A number of data stores have also been discussed. It will be noted the data store can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 5:
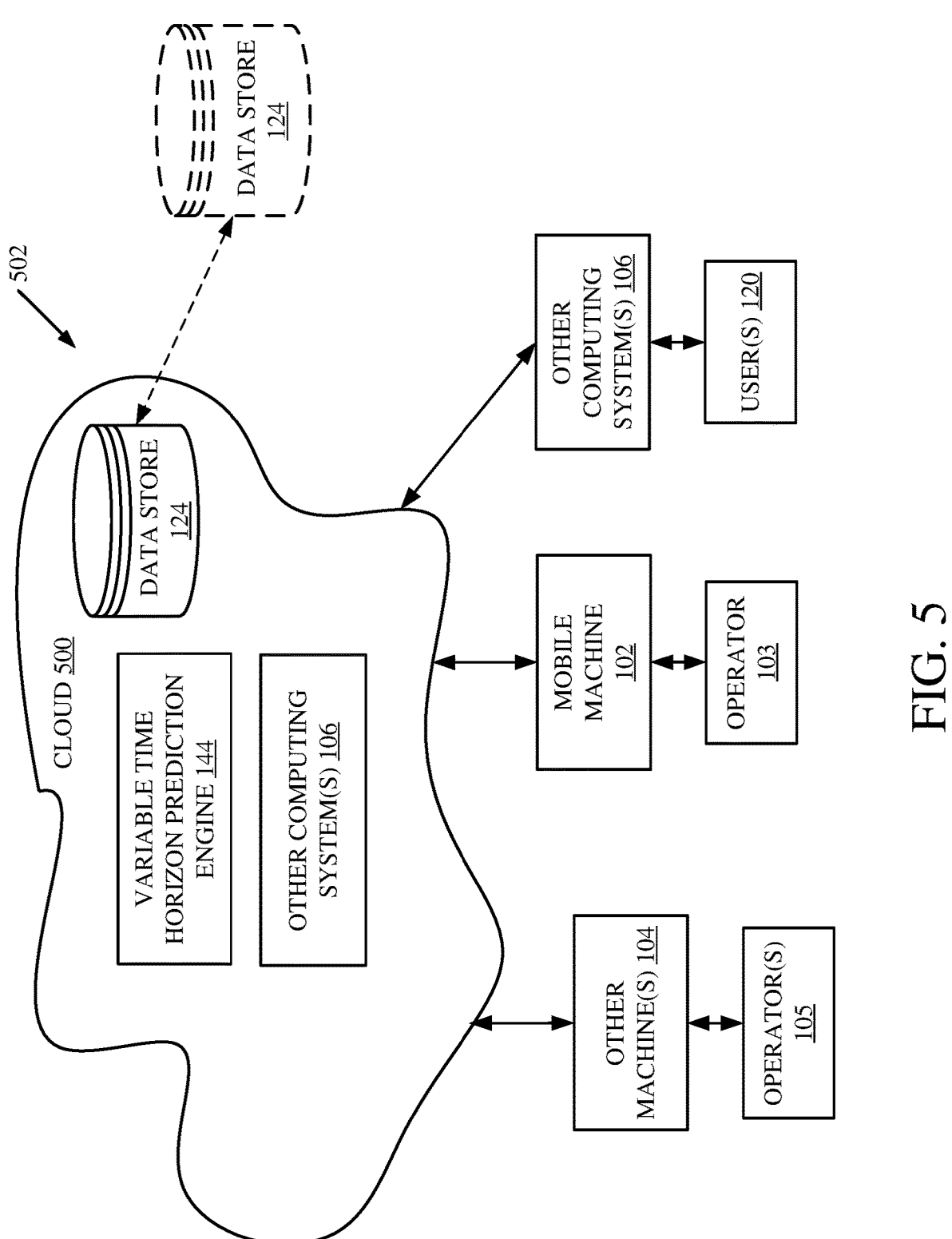
FIG. 5 is a schematic view of one example of an agricultural system in a remote server environment.

FIG. 5 is a block diagram of agricultural system 100, shown in FIG. 1, except that system 100 communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and the applications can be accessed through a web browser or any other computing component. Software or components shown in FIG. 1 as well as the corresponding data, can be stored on servers at a remote location. The computing resources in a remote server environment can be consolidated at a remote data center location or dispersed. Remote server infrastructures can deliver services through shared data centers, even though the data centers appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 5, some items are similar to those shown in FIG. 1 and they are similarly numbered. FIG. 5 specifically shows that variable time horizon prediction engine 144, and data store 124, and other computing systems 106 can be located at a remote server location 502. Therefore, agricultural machine 102, and other machines 104 access those systems through remote server location 502.

FIG. 5 also depicts another example of a remote server architecture. FIG. 5 shows that it is also contemplated that some elements of FIG. 1 are disposed at remote server location 502 while others are not. By way of example, data store 124 can be disposed at a location separate from location 502 and accessed through the remote server at location 502. Regardless of where the items are located, the items can be accessed directly by agricultural machine 102, through a network (either a wide area network or a local area network), or hosted at a remote site by a service, or provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the agricultural machine comes close to the fuel truck for fueling, the system automatically collects the information from the agricultural machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the agricultural machine until the agricultural machine enters a covered location. The agricultural machine, itself, can then send the information to the main network.

It will also be noted that the elements of FIG. 1, or portions of those elements, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
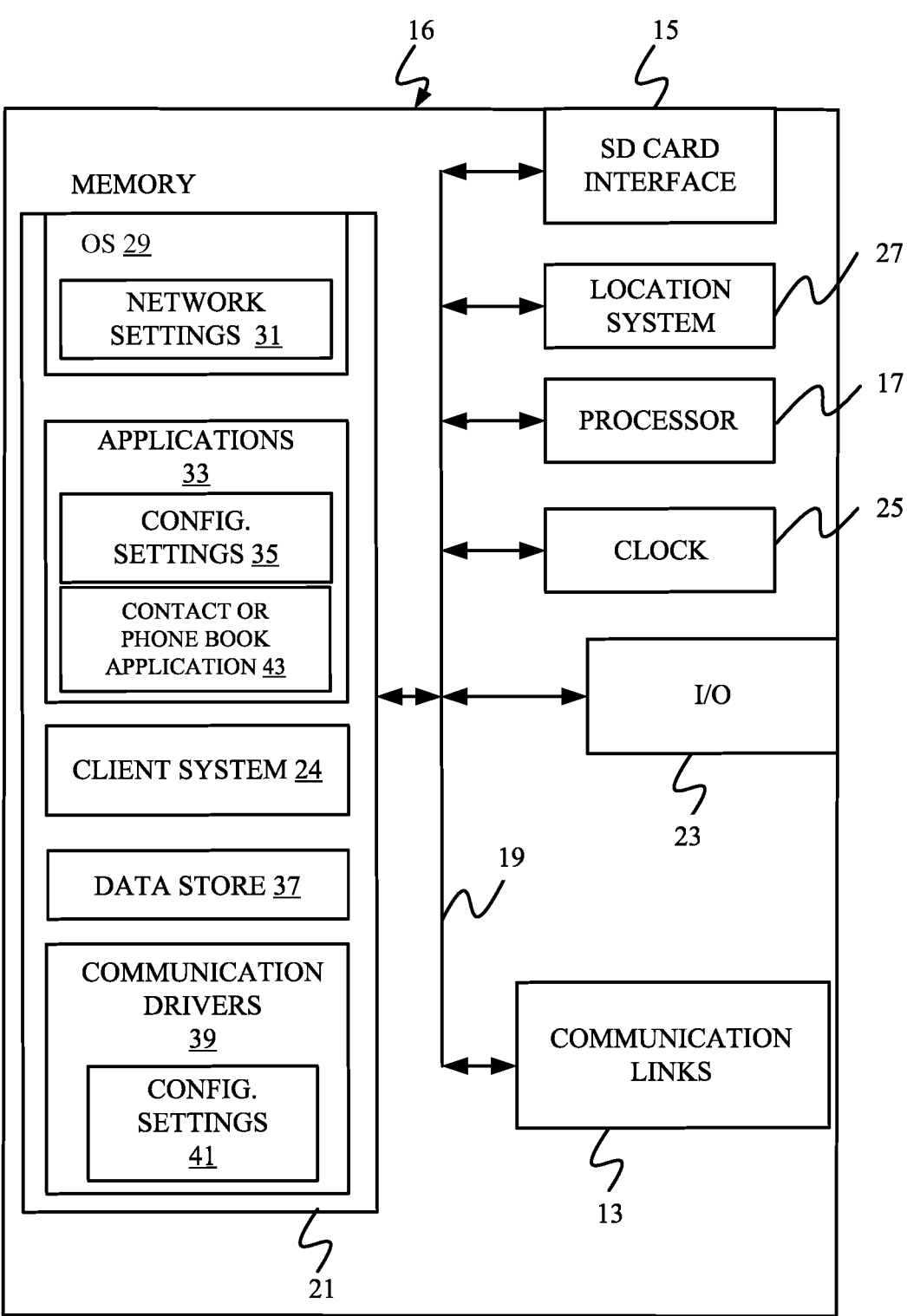
FIGS. 6-8 show examples of mobile devices that can be used in systems.
Figure 7:
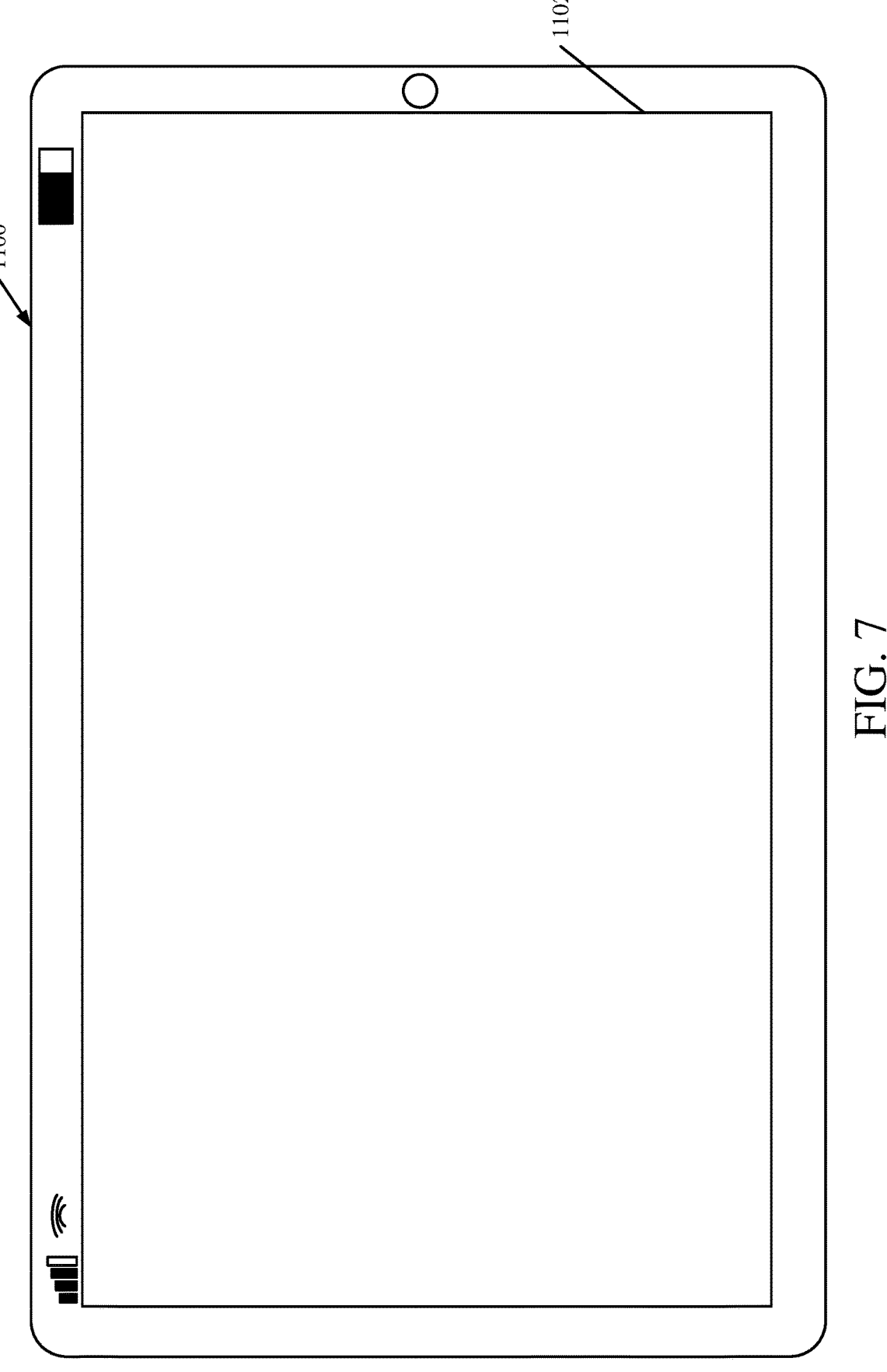
Figure 8:
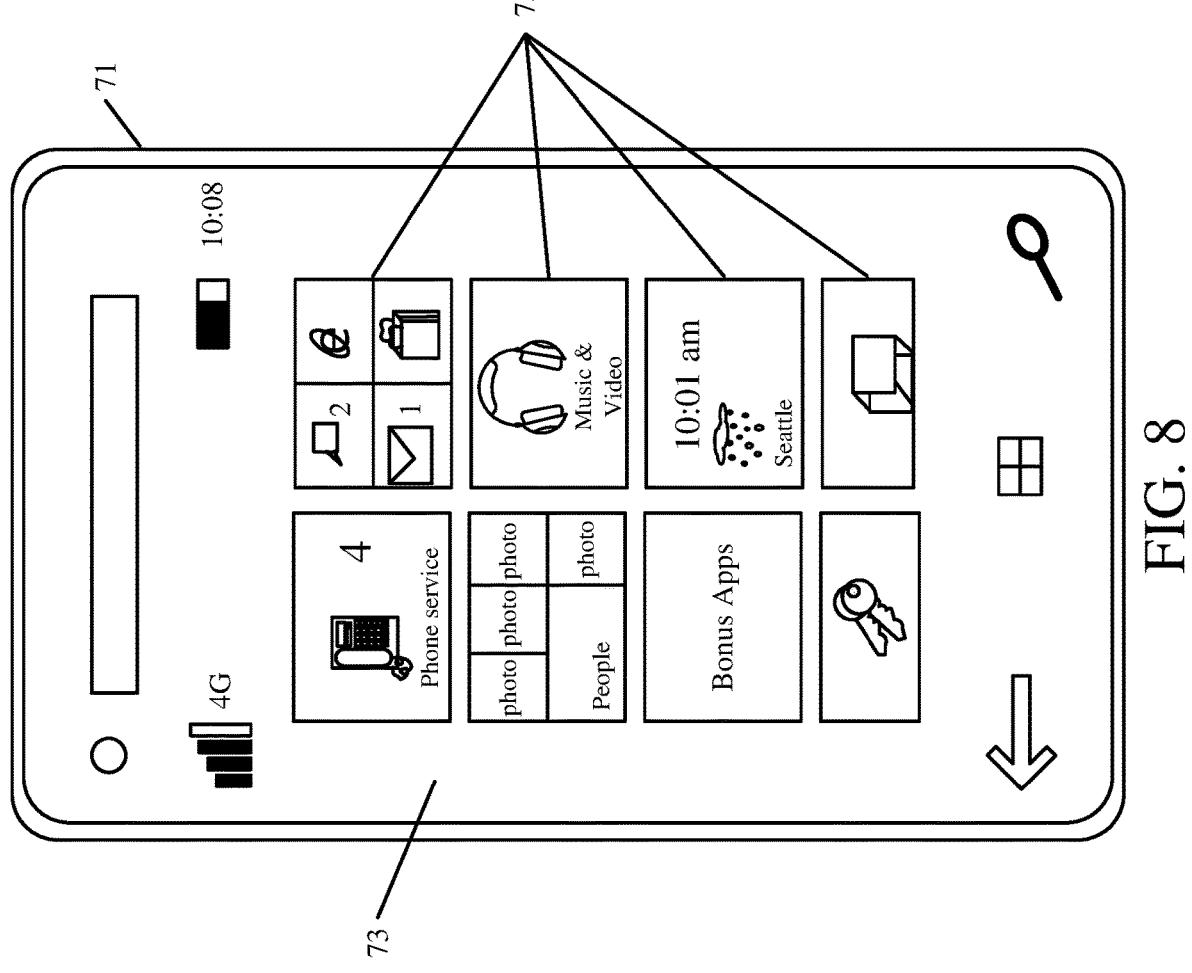

FIG. 6 is a simplified block diagram of one example of a handheld or mobile computing device that can be used as a user's or client's hand held device 16, in which the present system (or parts of it) can be deployed. For instance, a mobile device can be deployed in the operator compartment of agricultural machine 102 for use in generating, processing, or displaying the time horizon data. FIGS. 7-8 are examples of handheld or mobile devices.

FIG. 6 provides a general block diagram of the components of a client device 16 that can run some components shown in FIG. 1, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. Clock 25 can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. System 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one example in which device 16 is a tablet computer 600. In FIG. 6, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 8 shows that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
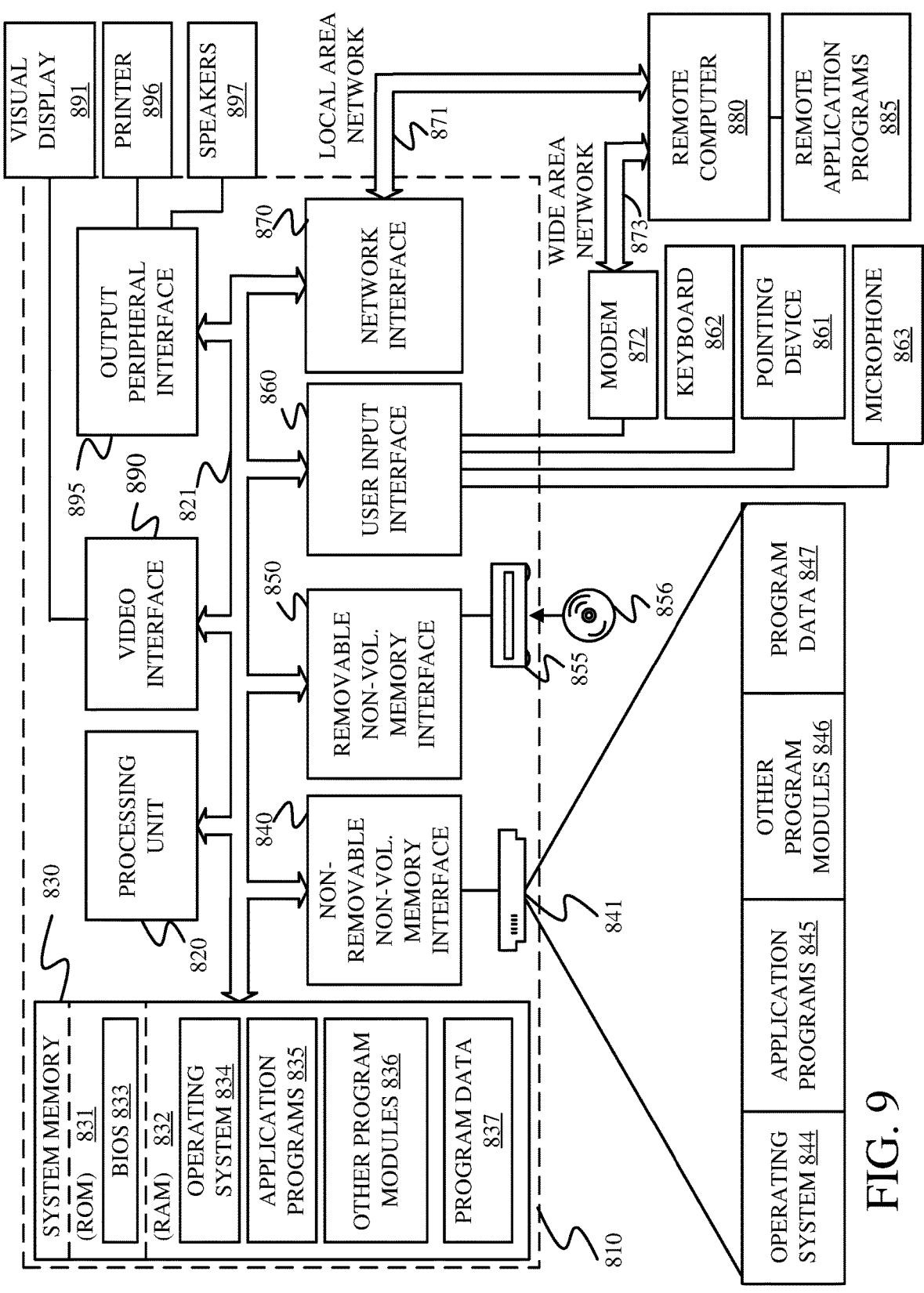
FIG. 9 is a block diagram showing one example of a computing environment.

FIG. 9 is one example of a computing environment in which elements of FIG. 1, or parts of it, (for example) can be deployed. With reference to FIG. 9, an example system for implementing some embodiments includes a general-purpose computing device in the form of a computer 810 programmed to operate as discussed above. Components of computer 810 may include, but are not limited to, a processing unit 820 (which can comprise a processor or server from other FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FP-GAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural operation control system, comprising:
one or more processors; and
memory storing computer executable instructions which, when executed by the one or more processors, configure the one or more processors to:
obtain an input and model an operation performance of an agricultural system across a plurality of different time horizons;
generate, based on the input, a first predictive output indicative of a first predicted operation performance over a first time horizon of the plurality of different time horizons, wherein the first time horizon corresponds to performance of a first set of one or more operations by a first mobile agricultural machine;
generate, based, at least, on the first predictive output, a second predictive output of a second predicted operation performance over a second time horizon of the plurality of different time horizons, wherein the second time horizon corresponds to performance of a second set of one or more operations by a second mobile agricultural machine that is different than the first mobile agricultural machine, the second set of one or more operations different than the first set of one or more operations and including at least one operation that is performed after the first set of one or more operations are performed, wherein the second predictive output of the second predicted operation performance over the second time horizon represents performance characteristics of the second mobile agricultural machine and is generated based on the model before control of the first mobile agricultural machine based on the first predictive output; and
control, based on the second predictive output, a controllable subsystem of the first mobile agricultural machine to controllably actuate at least one component of the controllable subsystem.

2. The agricultural operation control system of claim 1, wherein the input comprises a set of optimization criteria, and wherein the computer executable instructions, when executed by the one or more processors, further configure the one or more processors to:
access a data store and obtain the set of optimization criteria from operator preference data in the data store.

3. The agricultural operation control system of claim 2, wherein the optimization criteria is obtained as an operator input through an interface subsystem.

4. The agricultural operation control system of claim 2, wherein the computer executable instructions, when executed by the one or more processors, further configure the one or more processors to:
receive indication of a selected time horizon of the plurality of different time horizons, wherein the input comprises a parameter value for a time horizon-specific parameter specific to the selected time horizon; and generate the first predictive output based on the parameter value for the time horizon-specific parameter.

5. The agricultural operation control system of claim 4, wherein the computer executable instructions, when executed by the one or more processors, further configure the one or more processors to:
generate a display, the display showing:
the time horizon-specific parameter specific to the selected time horizon and a parameter value actuator that can be actuated to modify the parameter value for the time horizon-specific parameter; and
the selected time horizon and a time horizon actuator that is actuatable to select a different one of the plurality of different time horizons.

6. The agricultural operation control system of claim 1, wherein the controllable subsystem comprises at least one of:
a propulsion subsystem,
a steering subsystem, or
a material handling subsystem.

7. The agricultural operation control system of claim 1, and further comprising:
a plurality of different predictive time horizon performance models, each different predictive time horizon performance model, of the plurality of different predictive time horizon performance models, modeling operation performance across a different time horizon of the plurality of different time horizons.

8. The agricultural operation control system of claim 7, wherein the plurality of different predictive time horizon performance models comprises at least one of:
a current operation model configured to model operation performance of an agricultural machine across a current operation time horizon of the plurality of different time horizons, or
a current season model configured to model operation performance of the agricultural system across a current season time horizon of the plurality of different time horizons.

9. The agricultural operation control system of claim 7, wherein the plurality of different predictive time horizon performance models comprises:
a future season model configured to model operation performance of the agricultural system across a future season time horizon of the plurality of different time horizons.

10. The agricultural operation control system of claim 1, wherein the first mobile agricultural machine comprises a first agricultural machine type and the second mobile agricultural machine comprises a second agricultural machine type different than the first agricultural machine type.

11. The agricultural operation control system of claim 1, wherein the instructions, when executed by the one or more processors, configure the one or more processors to control the controllable subsystem based on the first predictive output.

12. A computer implemented method comprising:
obtaining an input and model an operation performance of an agricultural system across a plurality of different time horizons;
generating, based on the input, a first predictive output indicative of a first predicted operation performance over a first time horizon of the plurality of different time horizons, wherein the first time horizon corresponds to performance of a first set of one or more operations by a first mobile agricultural machine;

generating, based, at least, on the first predictive output, a second predictive output of a second predicted operation performance over a second time horizon of the plurality of different time horizons, wherein the second time horizon corresponds to performance of a second set of one or more operations by a second mobile agricultural machine that is different than the first mobile agricultural machine, the second set of one or more operations different than the first set of one or more operations and including at least one operation that is performed after the first set of one or more operations are performed, wherein the second predictive output of the second predicted operation performance over the second time horizon represents performance characteristics of the second mobile agricultural machine and is generated based on the model before control of the first mobile agricultural machine based on the first predictive output; and controlling, based on the second predictive output, a controllable subsystem of the first mobile agricultural machine to controllably actuate at least one component of the controllable subsystem.

13. The computer implemented method of claim 12, and further comprising:

obtaining a time horizon-specific parameter value for a time horizon-specific parameter based on the first time horizon;

identifying a time horizon model corresponding to the first time horizon, the time horizon model being identified from a plurality of different time horizon models each modeling operation performance across a different time horizon;

identifying a plurality of potential adjustments to the time horizon-specific parameter value;

generating a plurality of predictive operation outputs with the time horizon model based on the plurality of potential adjustments, each respective predictive operation output, of the plurality of predictive operation outputs, representing predicted operation performance with a respective potential adjustment of the plurality of potential adjustments;

generating a display that represents the plurality of predicted operation outputs and identifies the plurality of potential adjustments; and identifying a selected predictive operation output of the plurality of predicted operation outputs.

14. The computer implemented method of claim 12, and further comprising:

receiving indication of a selected time horizon of the plurality of different time horizons, wherein the input comprises a parameter value for a time horizon-specific parameter specific to the selected time horizon; and generating the first predictive output based on the parameter value for the time horizon-specific parameter.

15. The computer implemented method of claim 14, and further comprising:

generating a display showing:

the time horizon-specific parameter specific to the selected time horizon and a parameter value actuator that can be actuated to modify the parameter value for the time horizon-specific parameter; and the selected time horizon and a time horizon actuator that is actuatable to select a different one of the plurality of different time horizons.

16. The computer implemented method of claim 12, wherein the controllable subsystem comprises at least one of:

a propulsion subsystem, a steering subsystem, or a material handling subsystem.

17. The computer implemented method of claim 12, and further comprising accessing a plurality of different predictive time horizon performance models, each different predictive time horizon performance model, of the plurality of different predictive time horizon performance models, modeling operation performance across a different time horizon of the plurality of different time horizons.

18. The computer implemented method of claim 17, wherein the plurality of different predictive time horizon performance models comprises at least one of:

a current operation model configured to model operation performance of an agricultural machine across a current operation time horizon of the plurality of different time horizons, a current season model configured to model operation performance of the agricultural system across a current season time horizon of the plurality of different time horizons, or a future season model configured to model operation performance of the agricultural system across a future season time horizon of the plurality of different time horizons.

\* \* \* \* \*